US012504765B2

(12) United States Patent
Patel et al.

(10) Patent No.: US 12,504,765 B2
(45) Date of Patent: Dec. 23, 2025

(54) ARTIFICIAL INTELLIGENCE (AI)-BASED SYSTEM FOR AUTONOMOUS NAVIGATION OF ROBOTIC DEVICES IN DYNAMIC HUMAN-CENTRIC ENVIRONMENTS AND METHOD THEREOF

(71) Applicant: Inception Robotics, LLC, College Park, MD (US)

(72) Inventors: Utsav Vishnubhai Patel, Greenbelt, MD (US); Abhishek Kathpal, College Park, MD (US); Adarsh Jagan Sathyamoorthy, College Park, MD (US); Ujjwal Joshi, College Park, MD (US); Dinesh Manocha, Bethesda, MD (US)

(73) Assignee: Inception Robotics, LLC, MD (US)

( * ) Notice: Subject to any disclaimer, the term of this patent is extended or adjusted under 35 U.S.C. 154(b) by 0 days.

(21) Appl. No.: 19/008,766

(22) Filed: Jan. 3, 2025

(65) Prior Publication Data

US 2025/0224727 A1 Jul. 10, 2025

Related U.S. Application Data

(60) Provisional application No. 63/617,454, filed on Jan. 4, 2024.

(51) Int. Cl.
*G05D 1/622* (2024.01)
*G05B 13/02* (2006.01)
(Continued)

(52) U.S. Cl.
CPC ......... *G05D 1/225* (2024.01); *G05B 13/0265* (2013.01); *G05D 1/229* (2024.01);
(Continued)

(58) Field of Classification Search
CPC ........ G05D 1/225; G05D 1/622; G05D 1/229; G05D 1/644; G05D 2101/15; G05B 13/0265
See application file for complete search history.

(56) References Cited

U.S. PATENT DOCUMENTS 11,409,295 B1 * 8/2022 Samdaria ............. G05D 1/0217
11,498,587 B1 11/2022 Mitlin et al.
(Continued)

FOREIGN PATENT DOCUMENTS

CN 118443000 A 8/2024

OTHER PUBLICATIONS https://www.mdpi.com/2072-4292/15/19/4757; Sensing and Navigation for Multiple Mobile Robots Based on Deep Q-Network; Robotics Department, Yeungnam University, Gyeongsan 38541, Republic of Korea; Submission received: Aug. 25, 2023 / Revised: Sep. 26, 2023 / Accepted: Sep. 27, 2023 / Published: Sep. 28, 2023; Yanyan Dai, et al.

*Primary Examiner* — Matthew J. Reda
(74) *Attorney, Agent, or Firm* — Jason C. Cameron

(57) ABSTRACT

An artificial intelligence (AI)-based system and method for autonomous navigation of robotic devices in dynamic human-centric environments are disclosed. The AI-based system comprises an object tracking subsystem, a probabilistic estimation subsystem, a socially compliant behavior subsystem, a constrained space navigation subsystem, a commands processing subsystem, a virtual cost-map layer subsystem, and a path-planning subsystem. The AI-based system obtains sensor data using sensors. The AI-based system employs artificial intelligence (AI) models and machine learning (ML) models for computing probabilistic position data and generating convex hulls. The AI-based system generates high-cost zones for identifying boundaries associated with groups to plan navigation paths. The AI-based system generates waypoints for the robotic devices based on detecting constrained spaces in the dynamic human-centric environments by analyzing the sensor data. The AI-based system extracts navigational insights based on processing natural language commands and adaptively selects the navigation paths for autonomous navigation of the robotic devices.

17 Claims, 16 Drawing Sheets

(51) Int. Cl.

| | |
|---|---|
| ***G05D 1/225*** | (2024.01) |
| ***G05D 1/229*** | (2024.01) |
| ***G05D 1/644*** | (2024.01) |
| *G05D 101/15* | (2024.01) |

(52) U.S. Cl.

CPC ............. *G05D 1/622* (2024.01); *G05D 1/644* (2024.01); *G05D 2101/15* (2024.01)

(56) References Cited

U.S. PATENT DOCUMENTS

| | | | | |
|---|---|---|---|---|
| 11,753,039 | B2 * | 9/2023 | Scott | G06N 3/08 701/26 |
| 12,070,847 | B1 * | 8/2024 | Ebrahimi Afrouzi | B25J 9/1684 |
| 2019/0039242 | A1 * | 2/2019 | Fujii | B25J 9/1666 |
| 2019/0286145 | A1 | 9/2019 | LaFary et al. | |
| 2020/0166952 | A1 * | 5/2020 | Wang | G05D 1/0289 |
| 2020/0246973 | A1 * | 8/2020 | Trautman | B25J 9/1694 |
| 2021/0011461 | A1 * | 1/2021 | Fowler | G06N 5/01 |
| 2021/0132615 | A1 * | 5/2021 | Passot | G05D 1/0214 |
| 2021/0146541 | A1 * | 5/2021 | Trautman | G06V 40/10 |
| 2021/0223779 | A1 * | 7/2021 | Passot | G01C 21/20 |
| 2022/0136837 | A1 * | 5/2022 | Neeschal | G05D 1/0212 701/410 |
| 2022/0276654 | A1 * | 9/2022 | Lee | G05D 1/0214 |
| 2023/0123298 | A1 | 4/2023 | Holson et al. | |
| 2023/0320262 | A1 * | 10/2023 | Woo | G05D 1/0246 56/10.2 A |
| 2023/0391373 | A1 | 12/2023 | Di Cairano et al. | |
| 2024/0253665 | A1 * | 8/2024 | Gupta | B60W 30/095 |
| 2025/0110501 | A1 * | 4/2025 | Tsuda | G01C 21/3407 |
| 2025/0117025 | A1 * | 4/2025 | Le | G05D 1/646 |
| 2025/0221598 | A1 * | 7/2025 | Wang | A47L 11/4061 |

* cited by examiner

600

600

Overtakes and Follows Virtual lanes Social-compliant planner

Predicts path and avoids pedestrian flow interruption Social-compliant planner

(Continued 1)

900

B

Generate, by the one or more servers through a constrained space navigation subsystem, one or more waypoints for the one or more robotic devices based on detecting constrained spaces in the dynamic human-centric environments by analyzing the sensor data 920

Extract, by the one or more servers through a commands processing subsystem, one or more navigational insights based on processing one or more natural language commands obtained from one or more users 922

Obtain, by the one or more servers through a virtual cost-map layer subsystem, cost value data from at least one of: the one or more convex hulls, the one or more first-cost zones, the one or more corridor-cost maps, the one or more waypoints, and the one or more navigational insights 924

Analyze, by the one or more servers through a path-planning subsystem, the virtual cost layer map with one or more path-planning models for real-time local path-planning 926

Adaptively select, by the one or more servers through the path-planning subsystem, the one or more navigation paths based on at least one of: the sensor data, the object tracking data, the probability data, the one or more waypoints, the one or more navigational insights, and the virtual cost layer map for deployment to the one or more robotic devices, enabling autonomous navigation in the dynamic human-centric environments 928

Figure 9
(Continued 2)

ARTIFICIAL INTELLIGENCE (AI)-BASED SYSTEM FOR AUTONOMOUS NAVIGATION OF ROBOTIC DEVICES IN DYNAMIC HUMAN-CENTRIC ENVIRONMENTS AND METHOD THEREOF

CROSS REFERENCE TO RELATED APPLICATION(S)

This application claims the priority to and incorporates by reference the entire disclosure of U.S. provisional patent application bearing No. 63/617,454 filed on Jan. 4, 2024 and tilted "SYSTEM FOR AUTONOMOUS NAVIGATION OF ROBOTIC DEVICES AND METHOD THEREOF".

TECHNICAL FIELD

Embodiments of the present disclosure relate to robotics, and more particularly relate to an artificial intelligence (AI)-based system and an AI-based method for autonomous navigation of one or more robotic devices in dynamic human-centric environments.

BACKGROUND

Autonomous navigation of robotic devices in dynamic and densely populated environments poses significant challenges, necessitating innovative solutions at the intersection of robotics, artificial intelligence, and computer vision. In recent years, the deployment of robotic devices for various applications in crowded indoor spaces, such as airports, train stations, hospitals, and malls, has become increasingly prevalent. The potential applications range from automated delivery services to interactive guidance for individuals within public spaces.

One of the primary impediments to the widespread adoption of autonomous mobile robots (AMRs) in such environments is the difficulty in ensuring safe and socially compliant navigation. Commercially available AMRs often struggle to navigate seamlessly in high-density crowds, leading to an increased risk of collisions with humans. Existing collision avoidance technologies, while effective in avoiding inanimate obstacles, lack the nuanced ability to differentiate between humans and other obstacles, resulting in suboptimal and sometimes intrusive robot behaviors. This challenge is commonly referred to as the Freezing Robot Problem (FRP), where sudden halts, oscillatory motions, or unpredictable behaviors diminish the user experience and overall acceptance of robotic systems in shared spaces.

In the existing technology, an autonomous navigation method and system are disclosed. The system specifically focuses on establishing and navigating a virtual path within a predefined navigation space. The method utilizes coordinate points and connection relations to form the virtual path. The key steps involve acquiring the initial and destination positions of the robot, determining corresponding coordinate points on the virtual path, calculating the shortest path between these points using a path planning model, and guiding the robot along this virtual path to reach a destination. One significant drawback of this prior art lies in a reliance on high-precision sensors for accurate positioning and navigation. The method assumes the availability of precise information about the robot's initial and destination positions, which may necessitate the use of costly and sophisticated sensor technologies.

There are various technical problems with the autonomous navigation systems in the prior art. The FRP is a common challenge in conventional systems. Sudden halts, oscillatory motions, or unpredictable behaviors occur when robotic devices encounter obstacles, especially in crowded spaces. This led to discomfort and frustration among humans sharing the environment with the robot. Traditional systems may struggle to efficiently navigate around groups of people. The lack of specialized models for group detection and avoidance results in suboptimal paths or disruptive navigation patterns. Many conventional systems rely on static path planning models that do not adapt well to dynamic changes in the environment. This led to inefficient routes or difficulties in navigating through areas with rapidly changing crowd density. The conventional system's limitation results in less efficient use of structured spaces like corridors, where socially compliant navigation is essential Therefore, there is a need for a system to address the aforementioned issues by providing a solution for autonomous navigation of robotic devices in diverse environments, with a focus on enhancing efficiency, safety, and adaptability.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, an artificial intelligence (AI)-based method for autonomous navigation of one or more robotic devices in dynamic human-centric environments is disclosed.

In the first step, the AI-based method includes obtaining, by one or more servers through an object tracking subsystem, sensor data regarding one or more objects in the dynamic human-centric environments from one or more sensors. The one or more sensors comprise at least one of: one or more lidar sensors, one or more image capturing units, one or more depth sensors, one or more inertial measurement units (IMUs), and one or more proximity sensors.

In the next step, the AI-based method includes generating, by the one or more servers through the object tracking subsystem, object tracking data based on analyzing the sensor data using at least one of: one or more artificial intelligence (AI) models and one or more machine learning (ML) models. Generating the object tracking data comprises processing the sensor data using a leg tracking model as at least one of: the one or more AI models and the one or more ML models, to detect and track the one or more objects around the one or more robotic devices.

In the next step, the AI-based method includes estimating, by the one or more servers through a probabilistic estimation subsystem, a real-time position of the one or more objects based on the generated object tracking data. Estimating the real-time position of the one or more objects comprises: a) applying a Kalman filter as one or more probabilistic models, to determine at least one of: the real-time position and velocity of the one or more objects by performing a motion prediction step and a correction step based on the sensor data, b) computing one or more convex hulls over one or more defined time intervals, each defined time interval of the one or more defined time intervals is subdivided into smaller resolutions, to dynamically update a virtual cost map layer with varying levels of prediction certainty, c) associating the one or more convex hulls with cost value data based on the varying levels of prediction certainty, with one or more first certainty regions are assigned first cost data within the cost value data and one or more second certainty regions are assigned second cost data within the cost value data. The cost value data influences path-planning decisions for autonomous navigation, and d) estimating a state of the one or more objects in at least one of: cartesian coordinate systems and polar coordinate systems, including one or more parameters comprising at least one of: a radial distance, a radial angle, and an angular velocity.

In the next step, the AI-based method includes computing, by the one or more servers through the probabilistic estimation subsystem, probabilistic position data of the one or more objects after the one or more defined time intervals using one or more probabilistic models. In the next step, the AI-based method includes generating, by the one or more servers through the probabilistic estimation subsystem, the one or more convex hulls representing a possible position of the one or more objects after the one or more defined time intervals.

In the next step, the AI-based method includes obtaining, by the one or more servers through a socially compliant behavior subsystem, the generated object tracking data and the probabilistic position data to navigate the one or more robotic devices autonomously. In the next step, the AI-based method includes generating, by the one or more servers through the socially compliant behavior subsystem, the one or more first-cost zones around one or more groups of the one or more objects using at least one of: the one or more AI models and the one or more ML models for identifying one or more boundaries associated with the one or more groups to plan one or more navigation paths. Generating the one or more first-cost zones comprises applying a clustering model, including a Density-Based Spatial Clustering of Applications with Noise (DBSCAN) as at least one of: the one or more AI models and the one or more ML models, to group the one or more objects based on spatial density and delineate the one or more boundaries of the one or more groups in the dynamic human-centric environments.

In the next step, the AI-based method includes generating, by the one or more servers through the socially compliant behavior subsystem, one or more corridor-cost maps based on identifying one or more corridor zones in the dynamic human-centric environments to orient the one or more robotic devices within corridor environments to a defined path using at least one of: the one or more AI models and the one or more ML models. Generating the one or more corridor-cost maps based on a yaw orientation of the one or more robotic devices relative to the corridor environments, and biasing navigation to the defined path to emulate natural pedestrian behavior.

In the next step, the AI-based method includes analyzing, by the one or more servers through the socially compliant behavior subsystem, the generated one or more convex hulls to prioritize the one or more navigation paths to at least one of: avert navigating around the one or more objects and orient the one or more robotic devices in the defined path of the one or more corridor zones. Analyzing the generated one or more convex hulls comprises prioritizing the one or more navigation paths that pass behind the one or more objects to avert navigating in front of moving one or more objects, based on the analysis of the one or more convex hulls.

In the next step, the AI-based method includes generating, by the one or more servers through a constrained space navigation subsystem, one or more waypoints for the one or more robotic devices based on detecting constrained spaces in the dynamic human-centric environments by analyzing the sensor data. In the next step, the AI-based method includes generating, by the one or more servers through a two-dimensional local occupancy grid generator subsystem, a discretized set of grids to provide a top-down view of the dynamic human-centric environments of the one or more robotic devices. In the next step, the AI-based method includes mapping, by the one or more servers through the constrained space navigation subsystem, the generated one or more waypoints in the discretized set of grids to autonomously navigate the one or more robotic devices in the dynamic human-centric environments.

In the next step, the AI-based method includes extracting, by the one or more servers through a commands processing subsystem, one or more navigational insights based on processing one or more natural language commands obtained from one or more users. In the next step, the AI-based method includes processing, by the one or more servers through the commands processing subsystem, the one or more natural language commands using speech-to-text model to convert the one or more natural language commands into textual data. In the next step, the AI-based method includes parsing, by the one or more servers through the commands processing subsystem, the textual data using a language processing model to infer and extract the one or more navigational insights. In the next step, the AI-based method includes mapping, by the one or more servers through the commands processing subsystem, the extracted one or more navigational insights in the discretized set of grids. In the next step, the AI-based method includes detecting, by the one or more servers through the object tracking subsystem, one or more landmarks in the discretized set of grids based on the mapped one or more navigational insights using at least one of: one or more object detection models comprise you only look once (YOLO) and one or more vision language models comprise contrastive language-image pre-training (CLIP).

In the next step, the AI-based method includes obtaining, by the one or more servers through a virtual cost-map layer subsystem, the cost value data from at least one of: the one or more convex hulls, the one or more first-cost zones, the one or more corridor-cost maps, the one or more waypoints, and the one or more navigational insights.

In the next step, the AI-based method includes analyzing, by the one or more servers through a path-planning subsystem, the virtual cost map layer with one or more path-planning models for real-time local path-planning. Analyzing the virtual cost map layer comprises applying at least one of: a dynamic window approach (DWA) model and a Timed Elastic Band (TEB) planner, to adaptively select the one or more navigation paths in real-time based on the virtual cost map layer.

In the next step, the AI-based method includes adaptively selecting, by the one or more servers through the path-planning subsystem, the one or more navigation paths based on at least one of: the sensor data, the object tracking data, the probabilistic position data, the one or more waypoints, the one or more navigational insights, and the virtual cost map layer for deployment to the one or more robotic devices, enabling autonomous navigation in the dynamic human-centric environments.

In accordance with another embodiment of the present disclosure, an AI-based system for autonomous navigation of the one or more robotic devices in the dynamic human-centric environments is disclosed. The AI-based system comprises the one or more servers. The one or more servers comprise one or more hardware processors and a memory unit. The memory unit is operatively connected to the one or more hardware processors. The memory unit comprises a set of computer-readable instructions in form of a plurality of subsystems. The set of computer-readable instructions is configured to be executed by the one or more hardware processors. The plurality of subsystems comprises the object tracking subsystem, the probabilistic estimation subsystem, the socially compliant behavior subsystem, the constrained space navigation subsystem, the commands processing subsystem, the virtual cost-map layer subsystem, the path-planning subsystem, and the two-dimensional local occupancy grid generator subsystem.

In an embodiment, the object tracking subsystem is configured to obtain the sensor data regarding the one or more objects in the dynamic human-centric environments from the one or more sensors for generating the object tracking data using at least one of: the one or more AI models and the one or more ML models.

Yet in another embodiment, the probabilistic estimation subsystem is configured to: a) obtain the generated object tracking data to estimate the real-time position of the one or more objects, b) compute the probabilistic position data of the one or more objects after the one or more defined time intervals using the one or more probabilistic models, and c) generate the one or more convex hulls representing the possible position of the one or more objects after the one or more defined time intervals.

Yet in another embodiment, the socially compliant behavior subsystem is configured to: a) obtain the generated object tracking data and the probabilistic position data to navigate the one or more robotic devices autonomously, b) generate the one or more first-cost zones around the one or more groups of the one or more objects using at least one of: the one or more AI models and one or more ML models for identifying the one or more boundaries associated with the one or more groups to plan the one or more navigation paths, c) generate the one or more corridor-cost maps based on identifying the one or more corridor zones in the dynamic human-centric environments to orient the one or more robotic devices within the corridor environments to the defined path using at least one of: the one or more AI models and the one or more ML models, and d) analyze the generated one or more convex hulls to prioritize the one or more navigation paths to at least one of: avert navigating around the one or more objects, and orient the one or more robotic devices in the defined path in the one or more corridor zones.

Yet in another embodiment, the constrained space navigation subsystem is configured to generate one or more waypoints for the one or more robotic devices based on detecting constrained spaces in the dynamic human-centric environments by analyzing the sensor data. Yet in another embodiment, the commands processing subsystem is configured to extract one or more navigational insights based on processing one or more natural language commands obtained from one or more users.

Yet in another embodiment, the virtual cost-map layer subsystem is configured to obtain the cost value data from at least one of: the one or more convex hulls, the one or more first-cost zones, the one or more corridor-cost maps, the one or more waypoints, and the one or more navigational insights for generating the virtual cost map layer to navigate the one or more robotic devices.

Yet in another embodiment, the path-planning subsystem is configured to: a) analyze the virtual cost map layer with the one or more path-planning models for real-time local path-planning and b) adaptively select the one or more navigation paths based on at least one of: the sensor data, the object tracking data, the probabilistic position data, the one or more waypoints, the one or more navigational insights, and the virtual cost map layer for deployment to the one or more robotic devices, enabling autonomous navigation in the dynamic human-centric environments.

Yet in another embodiment, the two-dimensional local occupancy grid generator subsystem is configured to: a) provide a top-down view of the dynamic human-centric environments of the one or more robotic devices as a discretized set of grids, b) define a plurality of attributes to the one or more objects and free space in the discretized set of grids, and c) determine the position of the one or more robotic devices within the discretized set of grids based on the plurality of attributes.

In accordance with another embodiment of the present disclosure, a non-transitory computer-readable storage medium storing computer-executable instructions that, when executed by the one or more hardware processors, cause the one or more hardware processors to perform operations for autonomous navigation of the one or more robotic devices in the dynamic human-centric environments. The operations comprise: a) obtaining the sensor data regarding the one or more objects in the dynamic human-centric environments from the one or more sensors, b) generating the object tracking data using at least one of: the one or more AI models and the one or more ML models, c) estimating the real-time position of the one or more objects based on the generated object tracking data, d) computing the probabilistic position data of the one or more objects after the one or more defined time intervals using the one or more probabilistic models, e) generating the one or more convex hulls representing the possible position of the one or more objects after the one or more defined time intervals, f) obtaining the generated object tracking data and the probabilistic position data to navigate the one or more robotic devices autonomously, g) generating the one or more first-cost zones around the one or more groups of the one or more objects using at least one of: the one or more AI models and the one or more ML models for identifying the one or more boundaries associated with the one or more groups to plan the one or more navigation paths, h) generating the one or more corridor-cost maps based on identifying the one or more corridor zones in the dynamic human-centric environments to orient the one or more robotic devices within the corridor environments to the defined path using at least one of: the one or more AI models and the one or more ML models, i) analyzing the generated one or more convex hulls to prioritize the one or more navigation paths to at least one of: avert navigating around the one or more objects, and orient the one or more robotic devices in the defined path of the one or more corridor zones, j) generating the one or more waypoints for the one or more robotic devices based on detecting the constrained spaces in the dynamic human-centric environments by analyzing the sensor data, k) extracting the one or more navigational insights based on processing the one or more natural language commands obtained from one or more user, l) obtaining the cost value data from at least one of: the one or more convex hulls, the one or more first-cost zones, the one or more corridor-cost maps, the one or more waypoints, and the one or more navigational insights m) analyzing the virtual cost map layer with the one or more path-planning models for real-time local path-planning, and n) adaptively selecting the one or more navigation paths based on at least one of: the sensor data, the object tracking data, the probabilistic position data, the one or more waypoints, the one or more navigational insights and the virtual cost map layer for deployment to the one or more robotic devices, enabling autonomous navigation in the dynamic human-centric environments.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
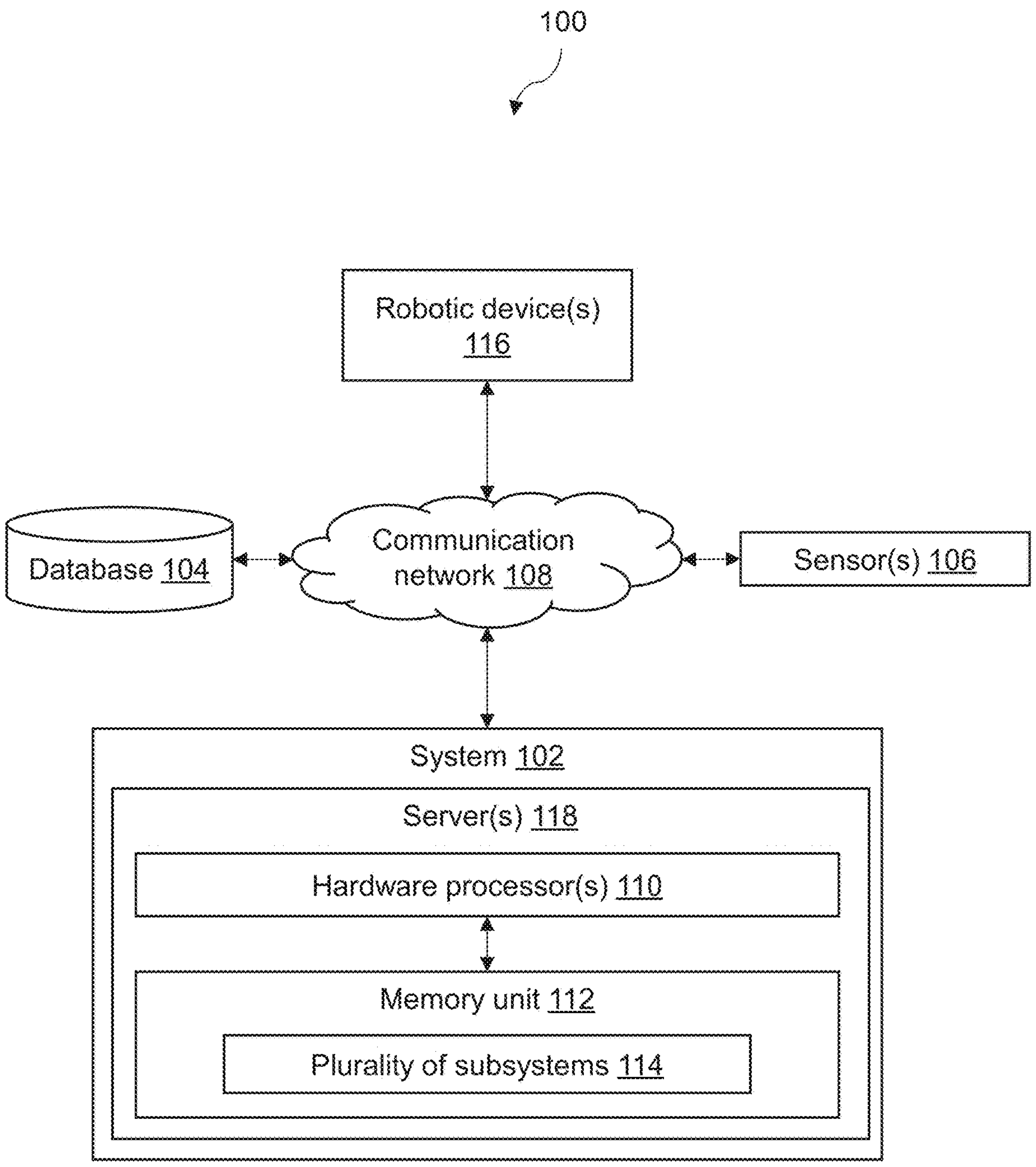
FIG. 1 illustrates an exemplary block diagram representation of a network architecture of an artificial intelligence (AI)-based system for autonomous navigation of one or more robotic devices in dynamic human-centric environments, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

As used herein the term "dynamic human-centric environments" refers to physical spaces predominantly occupied or traversed by humans, where the spatial layout, pedestrian density, and object positions are subject to frequent and unpredictable changes. Such environments include, but are not limited to, public places like airports, shopping malls, hospitals, train stations, and other densely populated areas where one or more robotic devices are required to interact with moving individuals and groups, navigate through complex layouts, and adapt to evolving spatial conditions in real-time. These dynamic human-centric environments present challenges due to their dynamic nature, requiring advanced perception, prediction, and socially compliant navigation to ensure safety, efficiency, and seamless coexistence of the one or more robotic devices with the humans.

As used herein the term "convex hulls" refers to a smallest convex boundary or polygon that encompasses a set of points in a two-dimensional or three-dimensional space. In the context of this disclosure, the convex hulls are generated to enclose and define the boundaries of the one or more objects or groups of objects detected within the dynamic human-centric environments. These convex hulls are computed based on sensor data obtained from the one or more sensors integrated into the AI-based system. The convex hulls are utilized to establish spatial boundaries that help the system identify areas of potential interaction or obstruction, such as high-density human groups, obstacles, or other moving entities.

As used herein, the term "high-cost zones" refers to spatial areas within the dynamic human-centric environments that are assigned higher navigation costs due to the presence of obstacles, densely populated regions, or socially sensitive zones, such as groups of humans or dynamic objects. These high-cost zones are generated using data obtained from the one or more sensors and are defined based on the outputs of at least one of: the one or more AI models and the one or more ML models. The high-cost zones represent areas that robotic devices should avoid or approach with caution to maintain socially compliant behavior and ensure safe navigation.

As used herein, the term "cost map layer" refers to a computational representation of the navigation environment, where spatial areas are assigned navigation cost values to guide the movement of one or more robotic devices through dynamic human-centric environments. The cost map layer integrates data from multiple subsystems, including object tracking, probabilistic estimation, and the socially compliant behavior subsystem. It incorporates elements such as high-cost zones, convex hulls, corridor-cost maps, and custom social costs to represent the navigation complexities of the environment.

Referring now to the drawings, and more particularly to FIG. 1 through FIG. 10, where similar reference characters denote corresponding features consistently throughout the figures, there are shown preferred embodiments, and these embodiments are described in the context of the following exemplary system and/or method.

FIG. 1 illustrates an exemplary block diagram representation of a network architecture 100 of an artificial intelligence (AI)-based system 102 for autonomous navigation of one or more robotic devices 116 in dynamic human-centric environments, in accordance with an embodiment of the present disclosure.

According to an exemplary embodiment of the present disclosure, FIG. 1 depicts the network architecture 100 may include the AI-based system 102, a database 104, one or more sensors 106, and the one or more robotic devices 116. The AI-based system 102 may be communicatively coupled to the database 104, the one or more sensors 106, and the one or more robotic devices 116 via a communication network 108. The communication network 108 may be a wired communication network and/or a wireless communication network. The database 104 may include, but is not limited to, storing, and managing data related to the dynamics of objects, characteristics of objects in the environment, coordinates and attributes of corridors within the dynamic human-centric environments, a global map of the building, containing information about key features, waypoints, and areas with specific navigation considerations, records of the robotic device historical navigation paths, decisions, and interactions, providing insights for future planning and optimization, and the like. The database 104 may be any kind of database such as, but not limited to, relational databases, Non-relational databases, graph databases, document databases, dedicated databases, dynamic databases, monetized databases, scalable databases, cloud databases, distributed databases, any other databases, and a combination thereof. The database 104 is configured to support the functionality of the AI-based system 102 and enables efficient data retrieval and storage for various aspects associated with a dynamic and socially intelligent navigation capabilities of the one or more robotic devices 116.

In an exemplary embodiment, the one or more sensors 106 comprises, but not limited to, lidar sensors, image capturing units, depth sensors, inertial measurement units (IMU), one or more proximity sensors, and the like. The one or more sensors 106 are configured to enable comprehensive environmental perception and facilitate socially intelligent navigation for the one or more robotic devices 116 in the dynamic human-centric environments. The lidar sensors and image capturing units are configured to detect one or more objects in the one or more robotic devices 116 path and precisely localize their positions in the dynamic human-centric environments. The one or more objects may comprise, but not limited to, pedestrians, obstacles, corridors, and the like. The one or more robotic devices 116 may comprises, but not limited to, at least one of: autonomous mobile robots (AMR), autonomous wheeled robots, legged robots, autonomous tracked robots, semi-autonomous wheeled robots, semi-autonomous tracked robots, Unmanned Aerial Vehicles (UAVs), Unmanned Ground Vehicles (UGVs), autonomous vehicles, hybrid mobility robotic devices, and the like.

This integrated network architecture 100 facilitates seamless communication and data exchange, enabling the AI-based system 102 to operate cohesively for advanced robotic navigation. The interconnected components of the network architecture 100 synergize to create a unified and responsive framework. The one or more sensors 106 continuously feed real-time environmental data to a plurality of subsystems 114, allowing the one or more robotic devices 116 to perceive and interpret their surroundings dynamically. The AI-based system 102 capability to adapt to dynamic environments and enhance autonomous navigation is underpinned by the effective collaboration among the AI-based system 102, the database 104, the one or more sensors 106, and the one or more robotic devices 116 within the communication network 108.

Further, the AI-based system 102 may be implemented by way of a single device or a combination of multiple devices that may be operatively connected or networked together. The AI-based system 102 may be implemented in hardware or a suitable combination of hardware and software. The AI-based system 102 includes one or more servers 118. The one or more servers 118 may comprise one or more hardware processors 110, and a memory unit 112. The memory unit 112 may include the plurality of subsystems 114. The AI-based system 102 may be a hardware device including the one or more hardware processors 110 executing machine-readable program instructions for autonomous navigation of the one or more robotic devices 116. Execution of the machine-readable program instructions by the one or more hardware processors 110 may enable the AI-based system 102 to dynamically recommend a course of action sequence for the one or more robotic devices 116. This involves real-time processing of environmental data received from the one or more sensors 106 and the collaborative interaction of the plurality of subsystems 114. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more hardware processors 110 may include, for example, microprocessors, microcomputers, microcontrollers, digital signal processors, central processing units, state machines, logic circuits, and/or any devices that manipulate data or signals based on operational instructions. Among other capabilities, the one or more hardware processors 110 may fetch and execute computer-readable instructions in the memory unit 112 operationally coupled with the AI-based system 102 for performing tasks such as data processing, input/output processing, and/or any other functions. Any reference to a task in the present disclosure may refer to an operation being or that may be performed on data.

Though few components and subsystems are disclosed in FIG. 1, there may be additional components and subsystems which is not shown, such as, but not limited to, ports, routers, repeaters, firewall devices, network devices, databases, network attached storage devices, servers, assets, machinery, instruments, facility equipment, emergency management devices, image capturing devices, any other devices, and combination thereof. The person skilled in the art should not be limiting the components/subsystems shown in FIG. 1.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the AI-based system 102 as is unique to the present disclosure or necessary for an understanding of the present disclosure is depicted and described. The remainder of the construction and operation of the AI-based system 102 may conform to any of the various current implementations and practices that were known in the art.

Figure 2A:
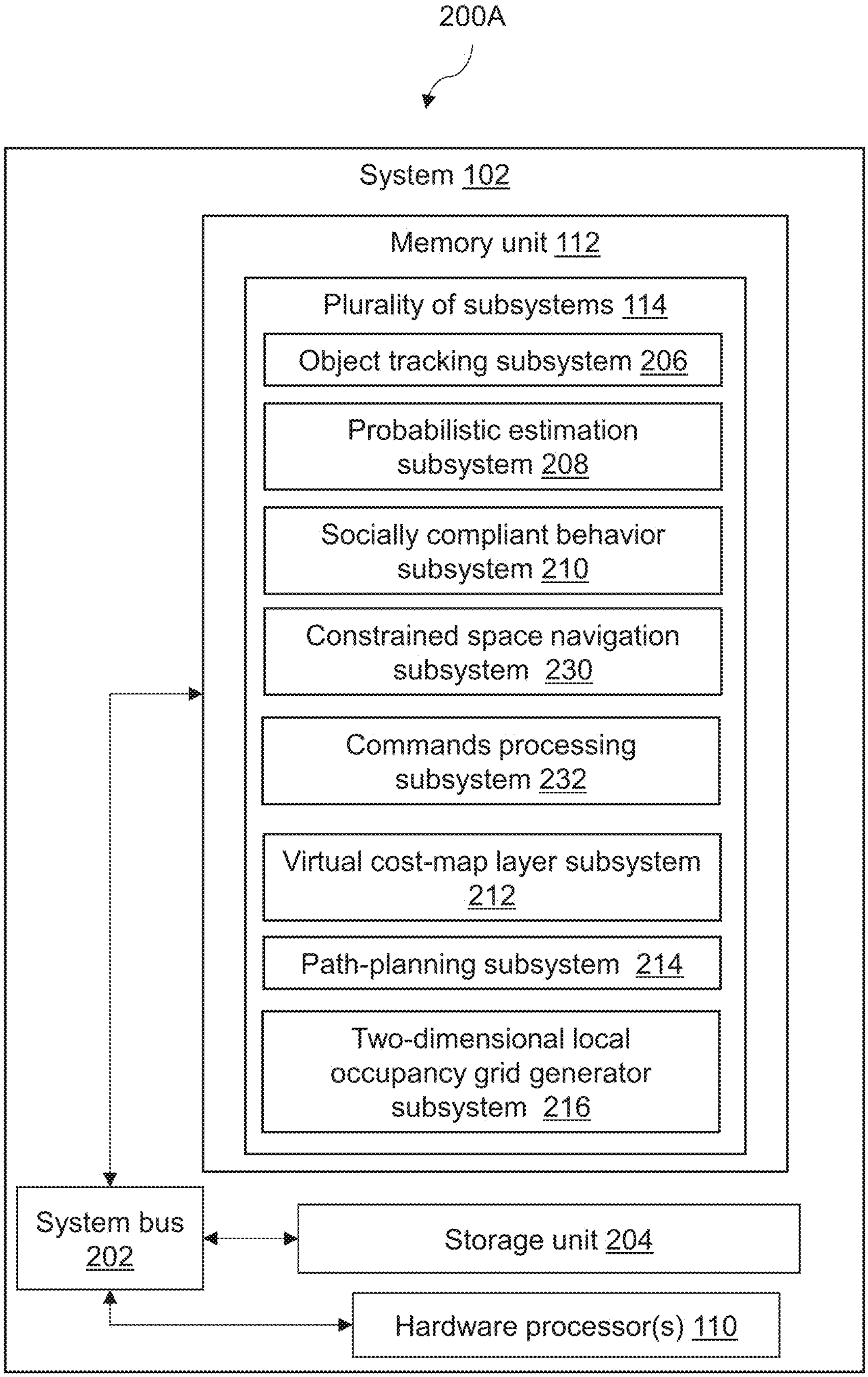
FIG. 2A illustrates an exemplary block diagram representation of the AI-based system as shown in FIG. 1 for the autonomous navigation of the one or more robotic devices, in accordance with an embodiment of the present disclosure.

FIG. 2A illustrates an exemplary block diagram representation 200A of the AI-based system as shown in FIG. 1 for the autonomous navigation of the one or more robotic devices, in accordance with an embodiment of the present disclosure.

In an exemplary embodiment, the AI-based system 102 (hereinafter referred to as the system 102). The system 102 comprises the one or more servers 118, the memory unit 112, and a storage unit 204. The one or more hardware processors 110, the memory unit 112, and the storage unit 204 are communicatively coupled through a system bus 202 or any similar mechanism. The system bus 202 functions as the central conduit for data transfer and communication between the one or more hardware processors 110, the memory unit 112, and the storage unit 204. The system bus 202 facilitates the efficient exchange of information and instructions, enabling the coordinated operation of the system 102. The system bus 202 may be implemented using various technologies, including but not limited to, parallel buses, serial buses, or high-speed data transfer interfaces such as, but not limited to, at least one of a: universal serial bus (USB), peripheral component interconnect express (PCIe), and similar standards.

In an exemplary embodiment, the plurality of subsystems 114 comprises an object tracking subsystem 206, a probabilistic estimation subsystem 208, a socially compliant behavior subsystem 210, a constrained space navigation subsystem 230, a commands processing subsystem 232, a virtual cost-map layer subsystem 212, a path-planning subsystem 214, and a two-dimensional local occupancy grid generator subsystem 216. The system 102 is configured to seamlessly integrate the plurality of subsystems 114, leveraging their specialized functionalities to enhance the overall autonomous navigation capabilities of the one or more robotic devices 116.

The one or more hardware processors 110, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, such as generic or programmable logic devices or arrays, application-specific integrated circuits, single-chip computers, and the like.

The memory unit 112 may be a non-transitory volatile memory and a non-volatile memory. The memory unit 112 may be coupled to communicate with the one or more hardware processors 110, such as being a computer-readable storage medium. The one or more hardware processors 110 may execute machine-readable instructions and/or source code stored in the memory unit 112. A variety of machine-readable instructions may be stored in and accessed from the memory unit 112. The memory unit 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 112 includes the plurality of subsystems 114 stored in the form of machine-readable instructions on any of the above-mentioned storage media and may be in communication with and executed by the one or more hardware processors 110.

The storage unit 204 may be a cloud storage or the database 104 such as those shown in FIG. 1. The storage unit 204 may store, but is not limited to, historical navigation records, probabilistic estimates, social grouping information, corridor coordinates and orientation data, global map data, custom costs for socially compliant behaviors, object tracking data, and the like. The storage unit 204 may be any kind of database such as, but are not limited to, relational databases, dedicated databases, dynamic databases, monetized databases, scalable databases, cloud databases, distributed databases, any other databases, and a combination thereof.

Figure 2B:
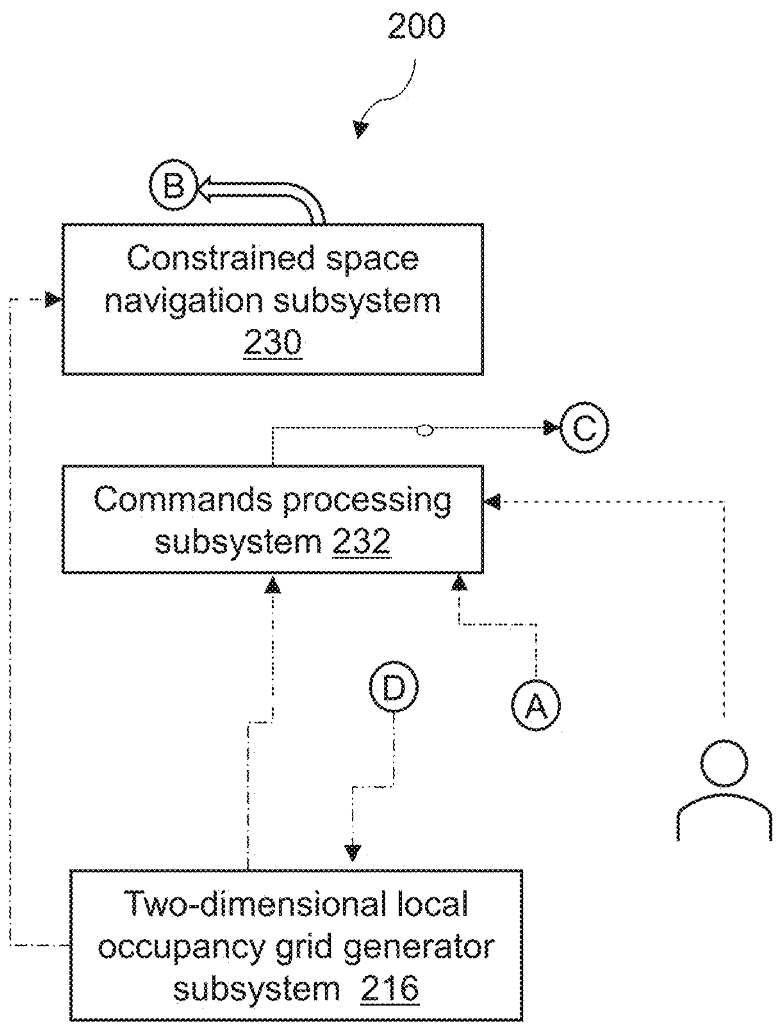
FIG. 2B illustrates an exemplary flow diagram representation of the AI-based system as shown in FIG. 1 for the autonomous navigation of the one or more robotic devices, in accordance with an embodiment of the present disclosure.
Figure 2B:
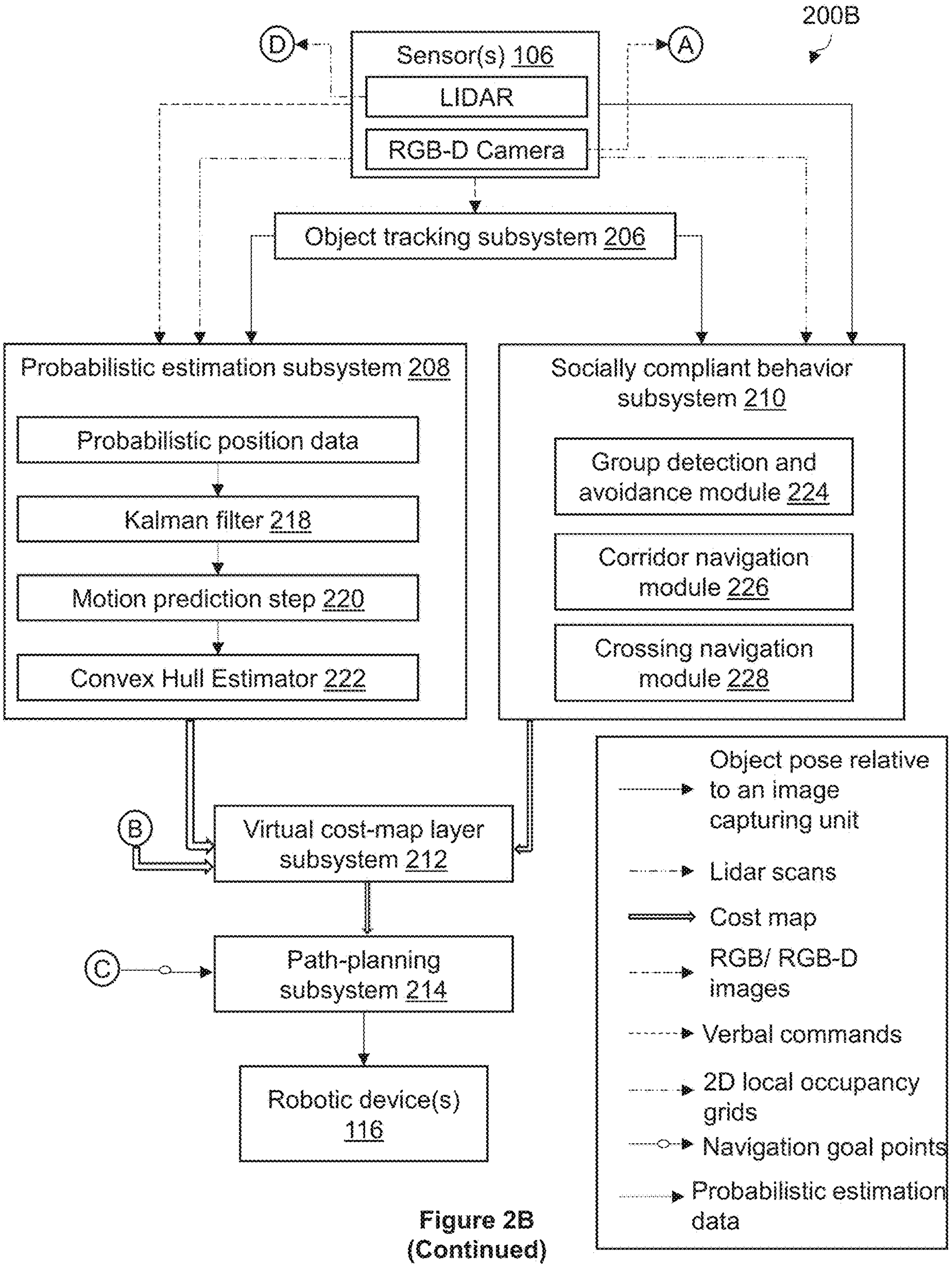

FIG. 2B illustrates an exemplary flow diagram representation 200B of the AI-based system as shown in FIG. 1 for the autonomous navigation of the one or more robotic devices, in accordance with an embodiment of the present disclosure.

In an exemplary embodiment, the object tracking subsystem 206 is configured to obtain sensor data regarding one or more objects in the dynamic human-centric environments from the one or more sensors 106 to generate object tracking data. The sensor data comprises real-time images of the one or more objects particularly, but not limited to, pedestrians and obstacles. The object tracking subsystem 206 is configured to focus on real-time monitoring and tracking of the one or more objects within the dynamic human-centric environments. The object tracking subsystem 206 continuously updates the system 102 with the object tracking data. The object tracking data comprises, but not limited to, latest positions and trajectories of the one or more objects, contributing to precise localization and obstacle avoidance. The object tracking subsystem 206 is configured with at least one of: one or more artificial intelligence (AI) models and one or more machine learning (ML) models. In an exemplary embodiment, at least one of: the one or more AI models and the one or more ML models may be a leg tracker model to track the one or more objects around the one or more robotic devices 116. In another exemplary embodiment, the object tracking subsystem 206 may be configured with vision-based object-tracking systems. The leg tracking model is configured to process the sensor data for detecting and tracking the one or more objects around the one or more robotic devices 116.

In an exemplary embodiment, the probabilistic estimation subsystem 208 is configured to obtain the generated object tracking data from the object tracking subsystem 206 for subsequent probabilistic calculations to estimate a real-time position of the one or more objects. The probabilistic estimation subsystem 208 is configured to employ one or more probabilistic models, such as a Kalman filter 218, to predict and estimate the future states of the one or more objects. The probabilistic estimation subsystem 208 is configured to compute probabilistic position data of the one or more objects after one or more defined time intervals using the Kalman filter 218 as the one or more probabilistic models. The Kalman filter configured to determine at least one of: the real-time positions and velocity, of the one or more objects by performing a motion prediction step 220 and a correction step based on the sensor data.

The Kalman filter 218 involves a continuous loop with two major steps—the motion prediction step 220 and a convex hull estimator 222. In the motion prediction step 220, the Kalman filter 218 is configured to estimate a state of the one or more objects in at least one of: cartesian coordinate systems and polar coordinate systems, including one or more parameters comprise at least one of: a radial distance, a radial angle, and an angular velocity.

The Kalman filter 218 predicts the future state of the one or more objects based on their current position in an XY coordinate frame relative to the one or more robotic devices 116. This involves utilizing one or more motion models, often, but not limited to, the constant velocity model, to project the position and velocity of objects into the future. The motion prediction step 220 provides an initial estimation of where the one or more objects are expected to be after a certain time interval Δt. The Kalman filter 218 is configured to compute the future states of tracked objects by at least one of: the cartesian coordinate systems and the polar coordinate systems. The at least one of: the cartesian coordinate systems and the polar coordinate systems includes, but not limited to, one or more parameters comprise at least one of: a radial distance, a radial angle, an angular velocity, and the like.

Following the motion prediction step 220, the Kalman filter 218 engages in the convex hulls step. In this stage, a fixed number of future states are sampled for the predicted time interval Δt. These samples are derived from the predicted states and associated covariances obtained from the motion prediction step 220. The spread of these samples is influenced by the uncertainties associated with the predicted states, specifically the covariances of the computed velocities. The probabilistic estimation subsystem 208 is configured to generate one or more convex hulls using the convex hull estimator 222 representing a possible position of the one or more objects after the one or more defined time intervals. The convex hull estimator 222 is configured to compute the one or more convex hulls over the one or more defined time intervals, each defined time interval of the one or more defined time intervals subdivided into smaller resolutions, to dynamically update the virtual cost map layer with varying levels of prediction certainty. The one or more convex hulls are associated with the cost value data based on the varying levels of prediction certainty, with one or more first certainty regions assigned first cost data within the cost value data and one or more second certainty regions assigned second cost data within the cost value data. The one or more first certainty regions may be one or more lower certainty regions, and the one or more second certainty regions may be one or more higher certainty regions. Similarly, the first cost data may be a lower cost data, and the second cost data may be higher cost data. The one or more lower certainty regions are assigned to the lower cost data within the cost value data and the one or more higher certainty regions are assigned to the higher cost data within the cost value data. Higher uncertainties result in a broader spread of predicted states, while lower uncertainties yield a narrower spread. The cost value data influences path-planning decisions for autonomous navigation.

Once the samples are obtained, the one or more convex hulls are fitted to the predicted states for the specified time interval Δt. The one or more convex hulls represent the potential future positions of the one or more objects, taking into account the uncertainties associated with their predicted movements. The output of the one or more convex hulls step is a set of convex hulls for each object of the one or more objects, each associated with covariances. The one or more convex hulls capture the potential spatial distributions of the one or more objects in the future, considering the inherent uncertainties in the motion prediction step 220. This continuous loop of the motion prediction step 220 and the convex hulls execution ensures that the probabilistic estimation subsystem 208 maintains an up-to-date and dynamic understanding of the future states of the one or more objects. The probabilistic estimation subsystem 208 is configured to update the virtual cost-map layer subsystem 212. Cost value data associated with the one or more convex hulls are determined by the covariance of the predicted states, influencing the path planning of the one or more robotic devices 116.

In an exemplary embodiment, the socially compliant behavior subsystem 210 comprises a group detection and avoidance module 224, a corridor navigation module 226, and a crossing navigation module 228. The socially compliant behavior subsystem 210 is configured to obtain the object tracking data from the object tracking subsystem 206 for informed and context-aware navigation. The socially compliant behavior subsystem 210 is configured to obtain the generated object tracking data and the probabilistic position data to navigate the one or more robotic devices autonomously. The group detection and avoidance module 224 is configured to generate one or more first-cost zones (i.e. high-cost zones) around one or more groups of the one or more objects using at least one of: the one or more AI models and the one or more ML models such as, but not limited to, a Density-Based Spatial Clustering of Applications with Noise (DBSCAN), and the like, for identifying one or more boundaries associated with the one or more groups to plan one or more navigation paths. The DBSCAN is configured to group the one or more objects based on spatial density and delineate the one or more boundaries of the one or more groups in the dynamic human-centric environments.

The corridor navigation module 226 is configured generate one or more corridor-cost maps based on identifying one or more corridor zones in the dynamic human-centric environments. The identification of the one or more corridor zones is achieved using sensor data from one or more sensors 106. The one or more sensors 106 provide the necessary environmental perception data to locate structural boundaries, such as walls or corridor edges, in real time. The corridor navigation module 226 employs at least one of: the one or more AI models and the one or more ML models to classify and segment the identified areas as the one or more corridor zones.

Once the one or more corridor zones are identified, the corridor navigation module 226 computes one or more corridor-cost maps. The one or more corridor-cost maps are configured to guide the one or more robotic devices 116 along a defined path within the identified one or more corridor zones while avoiding at least one of: the obstacles and restricted areas. The one or more corridor-cost maps are generated dynamically and updated in real time to account for changes in the dynamic human-centric environments, such as the presence of moving pedestrians or other one or more objects.

A key feature of the corridor navigation module 226 is its capability to use the yaw orientation of the one or more robotic devices 116 relative to the corridor environments. The yaw orientation, derived from the one or more robotic devices internal localization data, determines its current direction within the one or more corridor zones. This information is utilized to bias navigation paths toward the defined path. For example, the corridor navigation module 226 may prioritize paths on the right-hand side of a corridor to emulate natural pedestrian behavior, ensuring socially compliant navigation. This bias is introduced by assigning higher cost values to sections of the corridor-cost maps that lie outside the defined path, thereby encouraging the one or more robotic devices 116 to navigate along the defined path.

The crossing navigation module 228 is configured to analyze the generated one or more convex hulls to prioritize the one or more navigation paths for the one or more robotic devices 116. The one or more convex hulls, generated by the probabilistic estimation subsystem 208, represent the possible positions of the one or more objects after one or more defined time intervals. The one or more convex hulls are dynamically updated based on the real-time sensor data, which provides information on the movement and position of the one or more objects within the dynamic human-centric environments. The crossing navigation module 228 uses this information to make informed navigation decisions that prioritize safety and compliance with human social norms.

In particular, the crossing navigation module 228 is configured to avert navigating in front of the moving one or more objects by prioritizing navigation paths that pass behind them. This behavior is achieved by analyzing the one or more convex hulls associated with the predicted future states of the one or more objects. The crossing navigation module 228 assigns higher costs to navigation paths that intersect the convex hulls in front of the moving one or more objects, thereby disincentivizing paths that may disrupt the one or more objects natural trajectory. Conversely, the one or more navigation paths that avoid these high-cost zones and path behind the one or more objects are assigned lower costs, making them the preferred option for the one or more robotic devices 116.

This prioritization mechanism is critical in ensuring that the one or more robotic devices 116 exhibit socially compliant behavior, particularly in environments with high pedestrian traffic, such as airports, train stations, or shopping malls. For example, if a pedestrian is walking across the one or more robotic devices 116 intended path, the crossing navigation module 228 calculates the pedestrian's predicted movement using the one or more convex hulls and adjusts the one or more robotic devices 116 path to avoid cutting in front of the pedestrian. By selecting a path that passes behind the pedestrian, the crossing navigation module 228 minimizes the risk of collision and creates a more natural and comfortable interaction between the one or more robotic devices 116 and the one or more objects.

The crossing navigation module 228 is also configured to operate within the context of the one or more corridor zones. In such cases, the crossing navigation module 228 ensures that the prioritized one or more navigation paths are consistent with the corridor navigation strategy. For instance, the crossing navigation module 228 aligns the one or more robotic devices 116 movement with the defined path in the one or more corridor zones, while still avoiding disruptive behaviors, such as crossing in front of moving one or more objects. This integration enables the one or more robotic devices 116 to maintain adherence to corridor-specific navigation rules while dynamically adapting to the movement of the one or more objects in their vicinity.

In an exemplary embodiment, the constrained space navigation subsystem 230 is configured to generate one or more waypoints for the one or more robotic devices 116. The one or more waypoints are determined based on detecting constrained spaces, such as narrow passages, within the dynamic human-centric environments by analyzing the sensor data. The constrained space navigation subsystem 230 is configured to identify potential one or more navigation paths through the constrained spaces by assessing available free space and obstacles. The constrained space navigation subsystem 230 is configured to ensure that the generated one or more waypoints are optimally positioned to guide the one or more robotic devices 116 safely and efficiently through regions with limited maneuverability, while minimizing risks of collision with at least one of: static obstacles and dynamic obstacles.

In an exemplary embodiment, the two-dimensional local occupancy grid generator subsystem 216 is configured to create a discretized set of grids representing the surroundings of the one or more robotic devices 116. The discretized set of grids provides a top-down view of the dynamic human-centric environment, where each grid of the discretized set of grids corresponds to a specific area marked as one of: free space and the obstacle. The constrained space navigation subsystem 230 then maps the generated one or more waypoints onto the discretized set of grids. Using this mapping, the one or more robotic devices 116 autonomously navigate the constrained spaces by following the one or more waypoints while adapting to real-time environmental changes. This integration of waypoint generation and grid-based mapping enables precise, context-aware navigation for the one or more robotic devices 116 in the dynamic human-centric environments.

In an exemplary embodiment, the commands processing subsystem 232 is configured to extract one or more navigational insights. This extraction is based on processing the one or more natural language commands received from the one or more users. The one or more natural language commands are obtained through an audio capturing unit associated with one or more communication devices (e.g. a laptop, a mobile phone, a tablet, and the like). The commands processing subsystem 232 employs one or more speech-to-text large language models such as Whisper®, but not limited to, to convert the one or more natural language commands into textual data, enabling further processing. The textual data is then parsed using a language processing model such as Generative Pre-trained Transformer 4 omni (GPT-4o), but not limited to, that analyzes semantics and structure of the one or more natural language commands to infer user intent. By extracting the one or more navigational insights, such as specific destinations, object references, directional cues, and the like, the commands processing subsystem 232 transforms unstructured one or more natural language commands into structured instructions, paving the way for seamless robotic device 116 interaction in the dynamic human-centric environments.

After extracting the one or more navigational insights, the commands processing subsystem 232 integrates the one or more navigational insights into the discretized set of grids generated by the two-dimensional local occupancy grid generator subsystem 216. The grid-based approach not only enables structured navigation but also enhances the ability of the system 102 to interpret complex one or more natural language commands in the dynamic human-centric environments.

Simultaneously, the object tracking subsystem 206 is configured to detect relevant one or more landmarks within the discretized set of grids to support accurate navigation. This detection employs at least one of: one or more object detection models comprise, but not limited to, you only look once (YOLO) and one or more vision language models comprise contrastive language-image pre-training (CLIP). for understanding object-context relationships, and the like. By aligning the detected one or more landmarks with the mapped one or more navigational insights, the object tracking subsystem 206 enables the one or more robotic devices 116 to recognize and respond to environmental features. This harmonious integration of natural language understanding, environmental mapping, and object detection equips the one or more robot devices 116 with the capability to navigate dynamically and adaptively, ensuring effective performance in the dynamic human-centric environments.

In an exemplary embodiment, the virtual cost-map layer subsystem 212 configured to obtain cost value data from at least one of: the one or more convex hulls, the one or more first-cost zones, the one or more corridor-cost maps, the one or more waypoints, the one or more navigational insights, and the like. The virtual cost-map layer subsystem 212 integrates these diverse sources of cost value data to generate a unified virtual cost map layer that serves as the basis for navigating the one or more robotic devices 116 within the dynamic human-centric environments. The one or more convex hulls, computed by the probabilistic estimation subsystem 208, represent predicted future positions of the one or more objects within the environment and are associated with varying levels of cost based on prediction certainty. The one or more first-cost zones (one or more high-cost zones), generated by the socially compliant behavior subsystem 210, correspond to areas around social groupings that are assigned elevated cost values to ensure the one or more robotic devices 116 avoid disrupting group dynamics. The one or more corridor-cost maps, generated by the corridor navigation module, represent cost zones within the identified one or more corridor zones that bias the one or more robotic devices 116 toward the defined path to emulate natural pedestrian behavior.

The virtual cost-map layer subsystem 212 consolidates this contextual information with the cost value data from the probabilistic estimation subsystem 208 and the probabilistic estimation subsystem 210 to produce a comprehensive virtual cost map layer. The virtual cost map layer provides a holistic representation of the navigation environment, integrating static features (e.g., walls and corridors) with dynamic elements (e.g., moving objects and social groups) and their associated costs. By dynamically updating the virtual cost map layer in real-time, the virtual cost-map layer subsystem 212 ensures that the one or more robotic devices 116 are always equipped with the most accurate and relevant data to navigate the environment effectively.

Using the information in the virtual cost-map layer subsystem 212, the socially compliant behavior subsystem 210 dynamically plans the one or more navigation paths for the one or more robotic devices 116. The one or more navigation paths are prioritized based on the virtual cost map layer, which reflects the combined inputs from the one or more convex hulls, the one or more first-cost zones, and one or more corridor-cost maps. This enables the socially compliant behavior subsystem 210 to compute one or more navigation paths that navigate the one or more robotic devices 116 safely and intelligently, avoiding collisions, respecting social norms, and adhering to predefined corridor navigation strategies.

For example, if the virtual cost map layer indicates the presence of a dense group of pedestrians with high-cost zones around them and a narrow corridor with a defined lane, the socially compliant behavior subsystem 210 will compute a navigation path that avoids the high-cost zones associated with the one or more group while adhering to the lane bias in the corridor-cost map. The virtual cost-map layer subsystem 212 ensures that the resulting navigation path minimizes disruption to the one or more groups, avoids collisions, and maintains socially compliant behavior, such as keeping to one side of the corridor.

In an exemplary embodiment, the path-planning subsystem 214 is configured to analyze the virtual cost map layer with one or more path-planning models for real-time local path-planning. The path-planning subsystem 214 is configured to adaptively select the one or more navigation paths based on at least one of: the sensor data, the object tracking data, the probabilistic position data, the virtual cost map layer, the one or more waypoints, the one or more navigational insights, and the like, for deployment to the one or more robotic devices 116, enabling autonomous navigation in the dynamic human-centric environments. The one or more path-planning models comprise at least one of: a dynamic window approach (DWA) model and a Timed Elastic Band (TEB) planner, to adaptively select the one or more navigation paths in real-time based on the virtual cost map layer. The DWA model evaluates possible velocities and angular motions of the one or more robotic devices 116 in real time, ensuring safe and feasible movement. The TEB planner optimizes trajectories by considering time constraints and environmental obstacles, allowing for smooth and adaptive navigation. The DWA model and TEB planner utilize the virtual cost map layer to generate the one or more navigation paths that align with the one or more robotic devices 116 objective, such as avoiding high-cost zones, adhering to defined corridor paths, and respecting social group boundaries.

The path-planning subsystem 214 continuously adapts to changes in the surroundings, making real-time decisions to ensure socially compliant and efficient navigation. The path-planning subsystem 214 comprises, but not limited to, motor controllers and actuators, to translate the planned paths into physical movements, ensuring a seamless execution of the adaptive navigation strategy for the one or more robotic devices 116. By integrating real-time object tracking data with socially aware decision-making and probabilistic estimates, the socially compliant behavior subsystem 210 enables the one or more robotic devices 116 to navigate intelligently and adaptively in diverse and dynamic human-centric environments.

Figure 3:
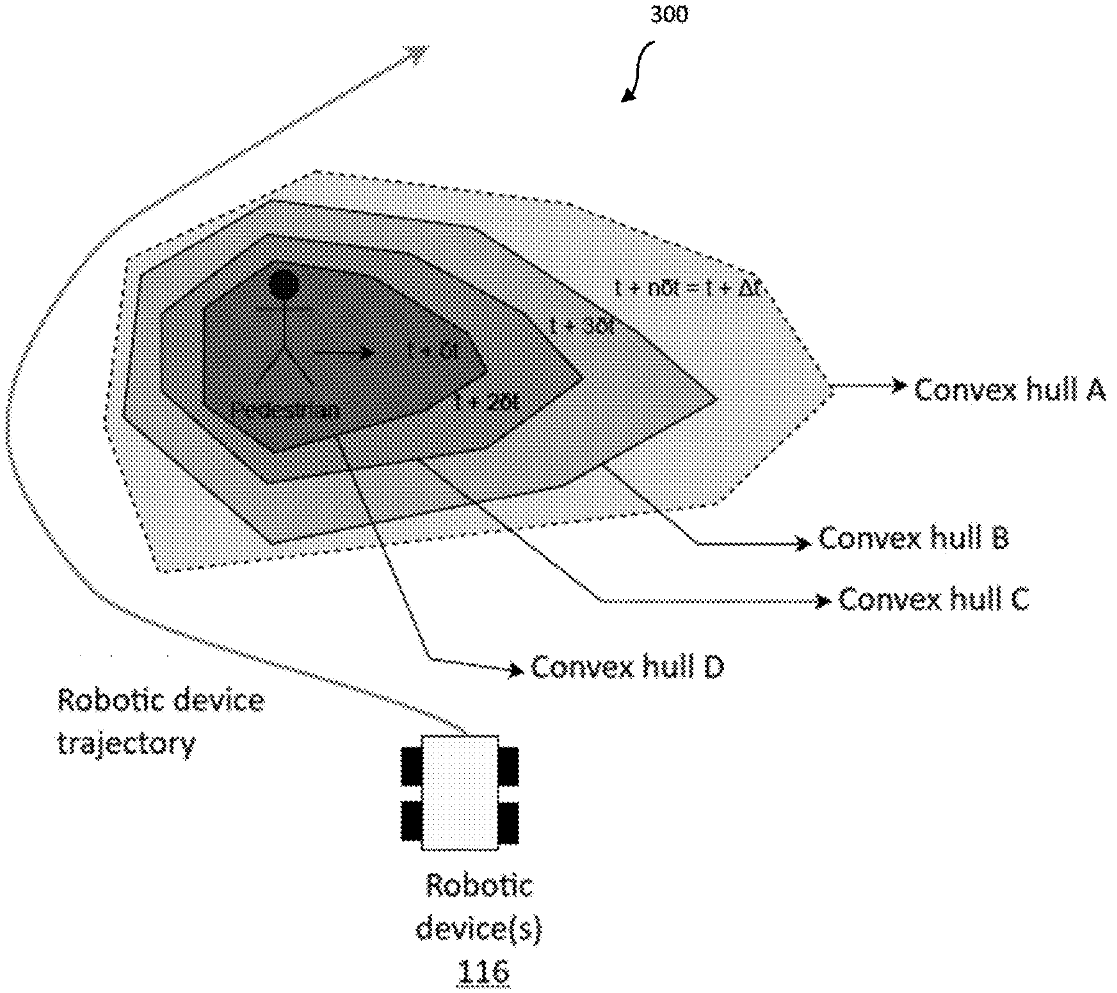
FIG. 3 illustrates an exemplary visually distinguishing convex hulls from time t to t+Δt divided by St time resolution, in accordance with an embodiment of the present disclosure.

FIG. 3 illustrates an exemplary visually distinguishing convex hulls 300 from time t to t+Δt divided by δt time resolution, in accordance with an embodiment of the present disclosure.

In an exemplary embodiment, the outcome of the probabilistic estimation subsystem 208 intricate process. For the depicted the one or more convex hulls, at least one of: the one or more AI models and the one or more ML models relies on the probabilistic estimation of tracked objects using the Kalman filter 218 as the one or more probabilistic models, specifically the motion prediction step 220 within the probabilistic estimation subsystem 208. The temporal parameter Δt is a crucial element in the at least one of: the one or more AI models and the one or more ML models, allowing for the tuning of performance based on the desired navigation characteristics. Within the motion prediction step 220, the Kalman filter's motion prediction step is selectively executed to forecast the state of the one or more objects after Δt time. This Δt time is further divided into multiple time windows of δt, a tunable one or more parameters representing the resolution of the at least one of: the one or more AI models and the one or more ML models.

The output of the motion prediction step 220 includes the estimated state of objects, encompassing positions and associated covariances in both XY and polar coordinate systems, for Δt within the interval of δt time. Subsequently, the convex hull estimator 222 comes into play. In this convex hull estimator 222, a fixed number (another tunable parameter) of states are sampled for the next Δt within the interval of δt time. These samples are derived based on the predicted states and associated covariances obtained from the motion prediction step 220. The covariance of the computed velocities controls the spread of these sampled states. When velocity estimates have optimal certainty, resulting in lower covariances, the spread of predicted states is narrow. Conversely, when velocity estimates have smaller certainty, leading to higher covariances, the spread of predicted states is broader.

Following the sampling, the one or more convex hulls are fitted to these states for the next Δt within the interval of δt time. The representation in FIG. 3 visually distinguishes convex hulls 300 based on their associated covariances. Darker shades indicate convex hulls with higher certainty (smaller covariances), while lighter shades represent convex hulls with lower certainty (higher covariances). The output of the convex hull estimator 222 consists of the one or more convex hulls for each object of the one or more objects for Δt within the interval of δt, along with associated covariances. These convex hulls are then passed to the virtual cost-map layer subsystem 212, where the cost value data are assigned based on the associated covariance. The one or more convex hulls with higher covariances receive lower cost value data, reflecting low confidence in the predicted pedestrian states, while convex hulls with lower covariances receive higher cost values, indicating higher confidence in the predicted pedestrian states. The resulting cost values are later utilized with the path-planning subsystem 214 to generate the path planning of the one or more robotic devices 116, ensuring socially compliant and dynamically adaptive navigation.

In an exemplary embodiment, the two-dimensional local occupancy grid generator subsystem 216 is configured to provide a top-down view of the dynamic human-centric environments of the one or more robotic devices 116 as a discretized set of grids. The two-dimensional local occupancy grid generator subsystem 216 employs advanced techniques to analyze the environment and define a set of attributes for the discretized grids, which capture crucial details about objects and free spaces. These attributes include, but are not limited to, the spatial occupancy of objects, boundaries, and the characteristics of free spaces within the environment. These attributes are fundamental for understanding the layout of the environment and identifying regions where navigation is possible versus areas that are obstructed.

By associating the plurality of attributes with specific grid cells, the two-dimensional local occupancy grid generator subsystem 216 establishes a detailed environmental map that is constantly updated in real-time. This allows the system 102 to determine the precise position of the one or more robotic devices 116 within the discretized grid, based on their location and the spatial relationship with the dynamic human-centric environments. This positional awareness is essential for planning and executing safe and efficient one or more navigation paths through the dynamic environment.

The discretized set of grids provide a flexible and efficient way to represent the dynamic human-centric environments, enabling the system 102 to make localized decisions based on the occupancy status of each cell. For example: a) cells associated with free space allow for low-cost navigation paths, b) the cells representing the one or more objects may be assigned higher costs or marked as non-navigable.

Figure 4:
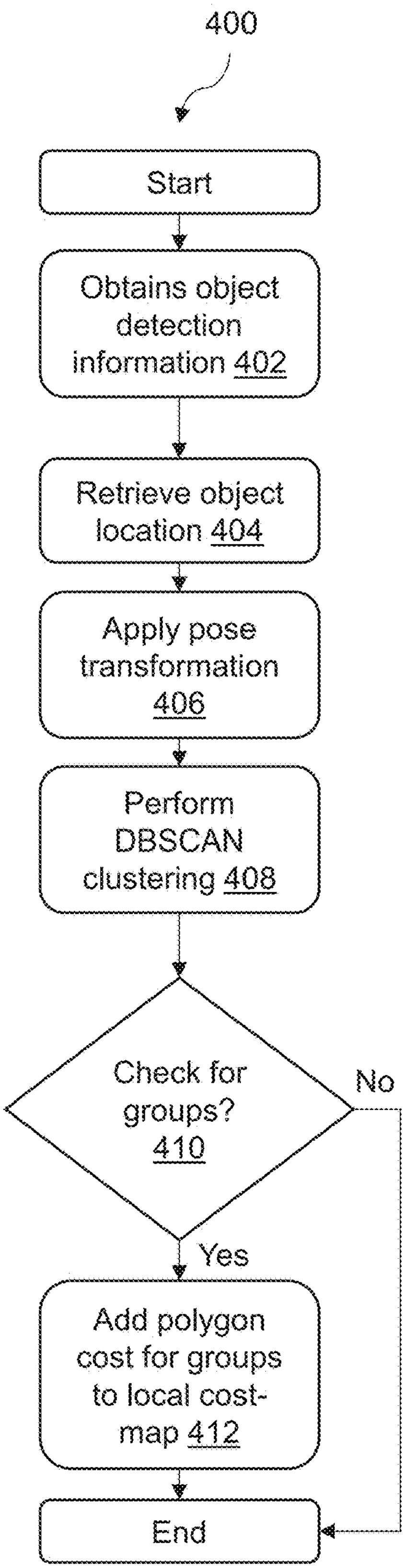
FIG. 4 illustrates an exemplary first flow chart depicting a group detection and avoidance module, in accordance with an embodiment of the present disclosure.

FIG. 4 illustrates an exemplary first flow chart 400 depicting a group detection and avoidance module 224, in accordance with an embodiment of the present disclosure.

In an exemplary embodiment, the system 102 facilitates the safe navigation of the one or more robotic devices 116 in public spaces, characterized by socially compliant behaviors. These behaviors have been seamlessly integrated with the path-planning subsystem 214 package in a Robot Operating System (ROS1) through the incorporation of the virtual cost map layer. The intricacies of the implementation of these socially compliant behaviors are comprehensively elucidated in the group detection and avoidance module 224, the corridor navigation module 226, and the crossing navigation module 228.

In an exemplary embodiment, the group detection and avoidance module 224 is configured with a specific objective of comprehending the dynamics of object groups and utilizing this understanding to plan a path for the one or more robotic devices 116 that navigates without disrupting an object groups cohesion. The one or more robotic devices 116, during its navigation, employs the object tracking subsystem 206 configured with the one or more sensors 106. The one or more sensors 106 comprises, but not limited to ZED2i camera to identify and detect objects such as pedestrians in its vicinity. Once pedestrians are detected, the group detection and avoidance module 224 is configured to generate one or more navigation paths for the one or more robotic devices 116 that avoid the one or more objects without infringing on the social space of the pedestrians. The objective is to navigate around the group in a manner that minimizes disruption and ensures a socially compliant interaction. To achieve an understanding of the group dynamics, the group detection and avoidance module 224 utilizes the DBSCAN technique. This widely used clustering approach groups pedestrians based on certain predefined criteria, assisting in defining the boundary of the pedestrian group.

Upon successfully clustering the one or more objects, the group detection and avoidance module 224 creates a polygon that outlines the one or more boundaries of the one or more groups. This polygon serves as a representation of the social space occupied by the one or more objects within the one or more groups. The generated polygon, delineating the one or more boundaries of the one or more groups, is then published to the corridor navigation module 226, and the crossing navigation module 228. In this process, the group detection and avoidance module 224 incorporates a polygon with higher costs (specified as 'add num') to the local cost map data. This addition influences the cost value data associated with the local environment, encouraging the one or more robotic devices 116 to navigate with heightened caution around the one or more groups.

At step 402, the system 102 obtains object detection information. The step 402 involves leveraging a stereo camera, such as, but not limited to, a ZED2 camera, to receive real-time data streams related to the one or more objects, detected in the dynamic human-centric environments. The camera object detection provides information about the one or more objects detected in the vicinity of the one or more robotic devices 116, serving as the foundational input for subsequent steps.

At step 404, the group detection and avoidance module 224 retrieves the sensor data from the subscribed topic. The sensor data typically includes the spatial coordinates of the one or more objects detected in the dynamic human-centric environments, which are necessary for accurate localization and clustering in later steps.

Next, at step 406, the retrieved sensor data undergoes a pose transformation using tf2 transform. The pose transformation aligns the sensor data with a coordinate frame of the one or more robotic devices 116, ensuring that the sensor data is represented in a consistent and robot-relative reference frame. This alignment is essential for precise spatial computations and navigation planning.

Following the transformation, the system 102 performs the DBSCAN clustering at step 408. The DBSCAN is a machine learning model used to group objects based on their spatial proximity. In this context, the DBSCAN clusters objects that are close to each other into the one or more groups, effectively identifying social groupings or clusters of pedestrians in the dynamic human-centric environments. The DBSCAN clustering is critical for recognizing dynamic one or more groups and isolating them as obstacles in the navigation process.

The process then proceeds to step 410, where the system 102 valuates whether any groups in the one or more groups have been detected. If no groups are identified (decision: "No"), the process terminates, as no further action is required for group-based cost assignment. Conversely, if groups are detected (decision: "Yes"), the process advances to step 412.

At step 412, the system 102 adds polygon cost for the one or more groups to the local cost-map. In this step, the detected one or more groups are represented as polygons, and a corresponding cost is assigned to these polygons within the local cost-map. The local cost-map is an integral part of the navigation planning process, as it assigns varying costs to different zones based on their navigational feasibility. By assigning high costs to group polygons, the system 102 discourages the one or more robotic devices 116 from entering or crossing these one or more first-cost zones (the one or more high-cost zone), thus avoiding socially disruptive interactions with human groups or other clustered objects. Finally, the process concludes after updating the virtual cost map layer with the group cost information, ensuring that the one or more robotic devices 116 may plan navigation paths that prioritize social compliance and obstacle avoidance.

Figure 5A:
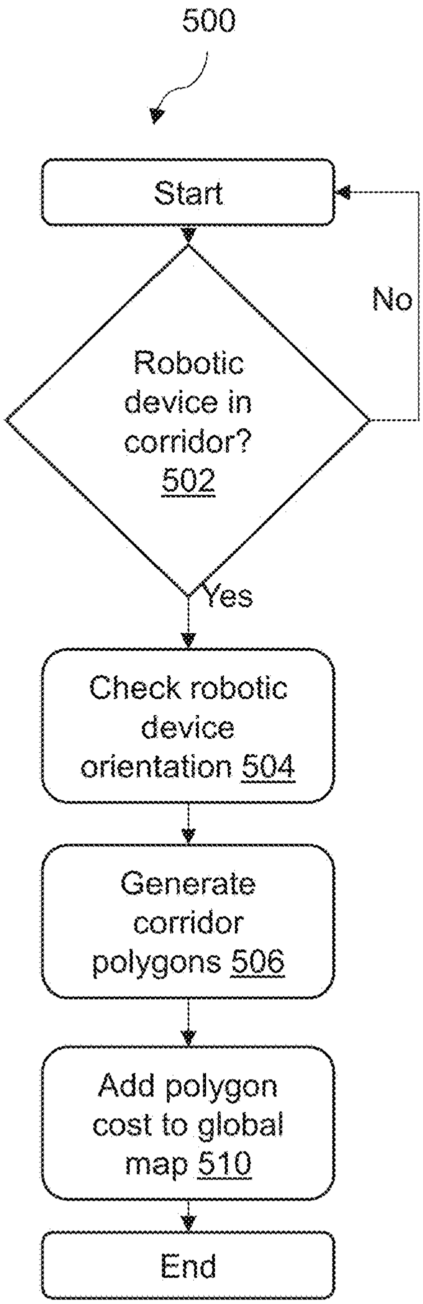
FIG. 5A illustrates an exemplary second flow chart depicting a corridor navigation module, in accordance with an embodiment of the present disclosure.

FIG. 5A illustrates an exemplary second flow chart 500 depicting a corridor navigation module 226, in accordance with an embodiment of the present disclosure.

In an exemplary embodiment, the corridor navigation module 226 is configured to enable the one or more robotic devices 116 to adeptly navigate within the one or more corridor zones, aligning with a predefined lane-keeping strategy, such as keeping to the any one side i.e., the defined path. At step 502, the process begins with the initiation of the corridor navigation module 226. At this stage, the system 102 prepares to evaluate the operational context of the one or more robotic devices 116 within the one or more corridor zones. At step 504, a decision step, the corridor navigation module 226 determines whether the one or more robotic devices 116 are currently located within the one or more corridor zones. This determination may be based on the sensor data, environmental mapping, and the predefined layout information. If "No": The process loops back, awaiting the one or more robotic devices 116 entry into the one or more corridor zones. If "Yes": The process continues to step 504 to further refine navigation based on the one or more robotic devices 116 positional and orientation data.

At step 506, once it is established that the one or more robotic devices 116 are in the one or more corridor zones, the corridor navigation module 226 evaluates its yaw orientation relative to the one or more corridor zones. This step ensures the one or more robotic devices 116 aligns with the corridor's direction, which is essential for smooth and efficient navigation. Misalignment may lead to inefficient movement or collisions with the one or more objects. At step 508, based on the orientation of the one or more robotic devices 116, the corridor navigation module 226 generates corridor polygons. The corridor polygons represent the geometric boundaries of the one or more corridor zones and encapsulate the one or more corridor zones within which the one or more robotic devices 116 are encouraged to navigate. The corridor polygons define the navigable space and help ensure the one or more robotic devices 116 remains within socially and spatially compliant paths.

At step 510, the generated corridor polygons are then integrated into the virtual cost map layer by assigning them a specific cost value. High-cost zones might represent areas to avoid, while lower-cost zones signify preferred paths. This cost assignment enables the one or more robotic devices 116 to prioritize the one or more navigation paths within the one or more corridor zones that align with the natural flow of pedestrian movement and avoid unnecessary deviations. The process concludes after successfully adding the corridor polygons and their associated costs to the virtual cost map layer. This ensures the one or more robotic devices 116 has an updated map for real-time navigation.

Figure 5B:
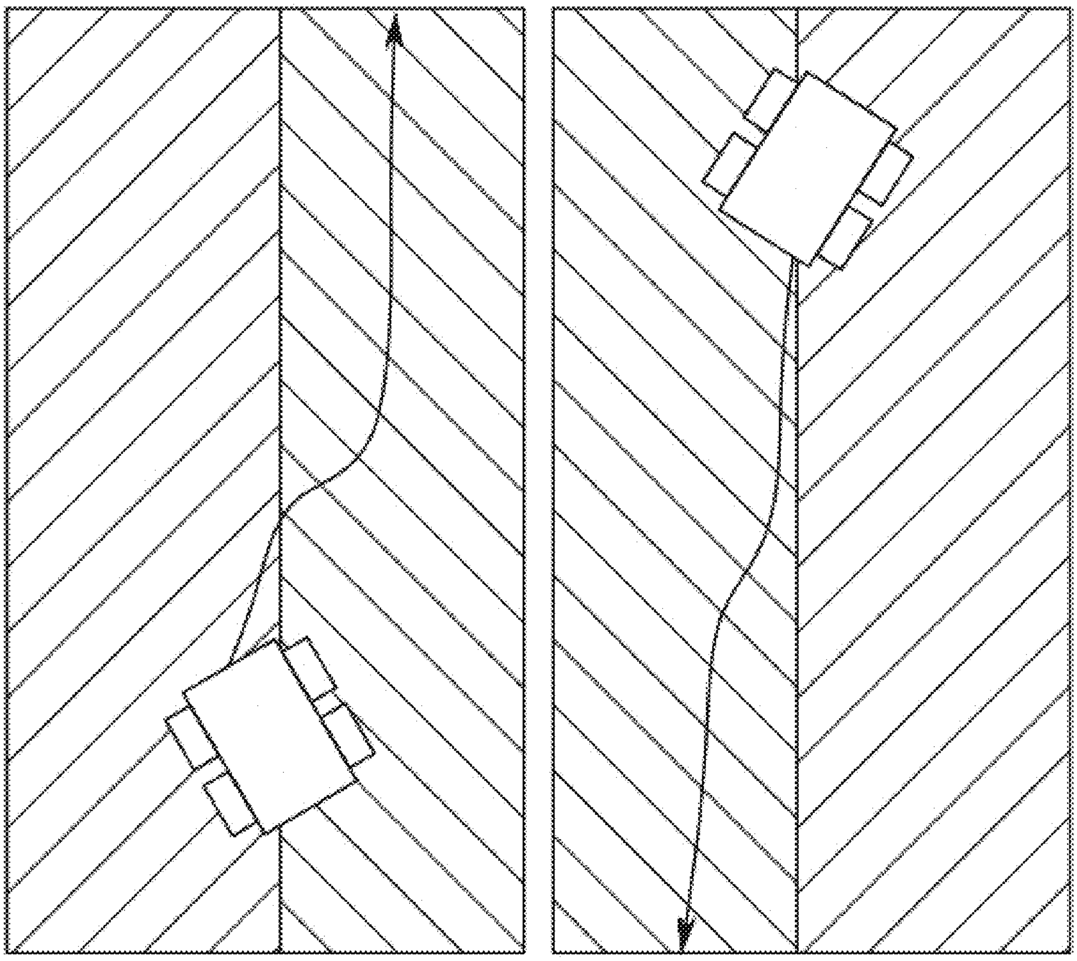
FIG. 5B illustrates an exemplary top view of the one or more robotic devices orientation, in accordance with an embodiment of the present disclosure.

FIG. 5B illustrates an exemplary top view of the one or more robotic 116 devices orientation, in accordance with an embodiment of the present disclosure.

In an exemplary embodiment, the crossing navigation module 228 is engineered with an explicit purpose of minimizing collision risks and ensuring a respectful distance between the one or more robotic devices 116 and objects during crossing scenarios. This is achieved by strategically generating a navigation path that positions the one or more robotic devices 116 behind the one or more objects, avoiding the potential disruption of cutting in front of them. The integration of the probabilistic estimation subsystem 208, developed in preceding tasks, plays a pivotal role in managing this crossing behavior. By forecasting the future pedestrian path and generating a collision-free trajectory, the probabilistic estimation subsystem 208 implicitly addresses the goal of safe and socially aware navigation. This behavior not only enhances overall safety but also contributes to fostering a more natural and comfortable coexistence between the one or more robotic devices 116 and objects in shared spaces.

The probabilistic estimation subsystem 208 is implemented as a custom cost-map layer within the path-planning subsystem 214 local planner of ROS1. The path-planning subsystem 214, responsible for the navigation of the one or more robotic devices 116 by processing the sensor data and controlling motor commands, is augmented with the Probabilistic Dynamic Window Approach (PDWA). This enhancement adds a layer of pedestrian-aware decision-making to the local planner, seamlessly integrating with the standard navigation and obstacle avoidance systems. The integration is configured to assign elevated costs to areas in front of objects within the cost map. This strategic cost assignment influences the path-planning model associated with the one or more robotic devices 116, naturally steering the one or more robotic devices 116 toward routes that circumvent the higher-cost zones in front of pedestrians. This prioritization results in safer, more respectful navigation behavior, aligning with the social norms of maintaining a respectful distance during pedestrian crossings.

To enhance socially compliant behavior, the virtual cost-map layer subsystem 212 package is utilized to introduce custom costs in addition to standard obstacle costs for collision avoidance. The AMCL (Adaptive Monte Carlo Localization) package is employed for localization, and a standard global planner, using the A* model, is selected. The process involves mapping the test site initially using the gmapping ROS package, which employs an efficient Rao-Blackwellized particle filter to learn grid maps from laser range data. This comprehensive integration ensures the system 102 combines precise localization, strategic global planning, and specialized cost considerations for socially compliant behavior.

Figure 6A:
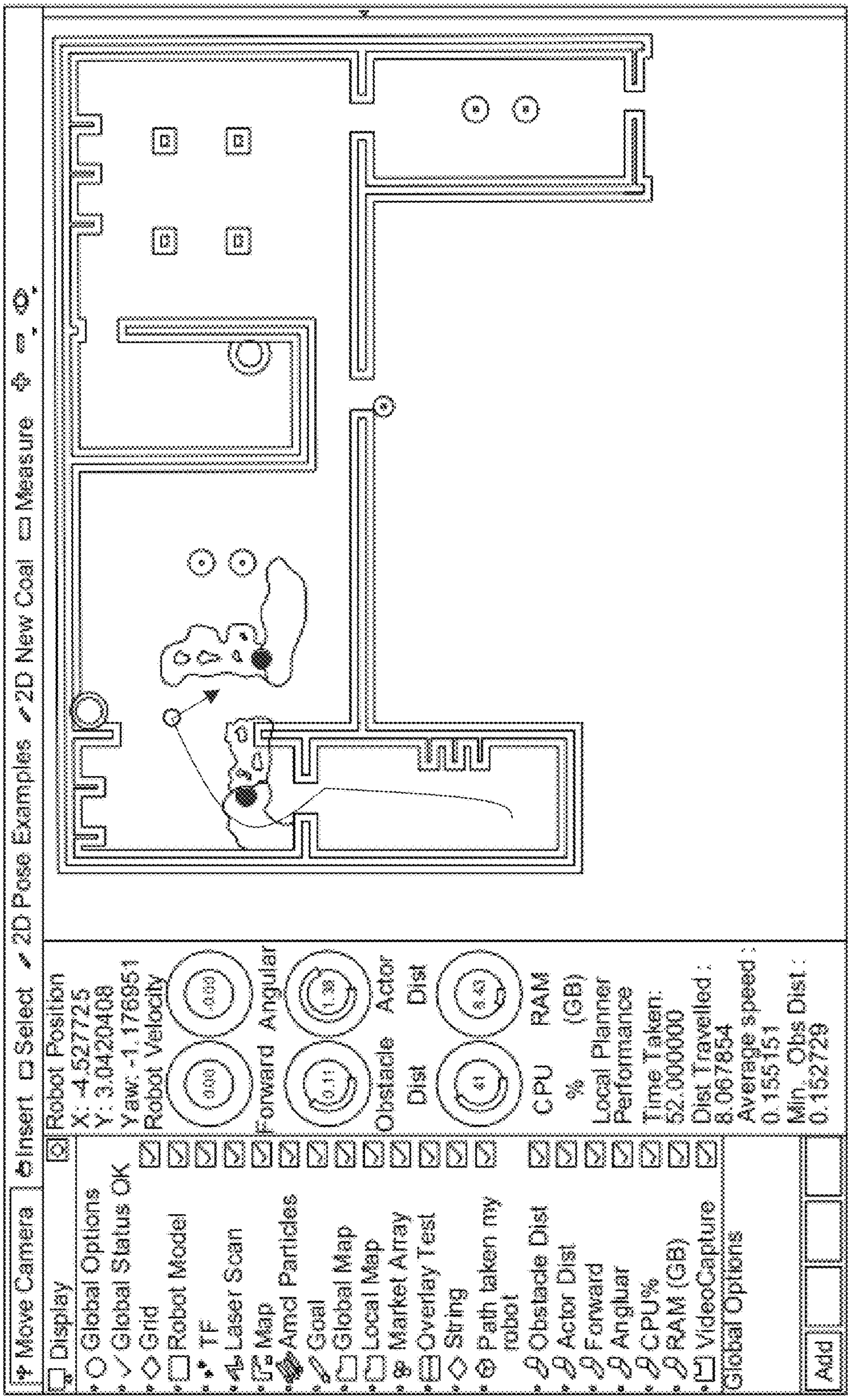
FIG. 6A and FIG. 6B illustrates exemplary screenshots of a simulation of a Probabilistic Dynamic Window Approach (PDWA) with 6 dynamic obstacles in a simple area, in accordance with an embodiment of the present disclosure.
Figure 6B:
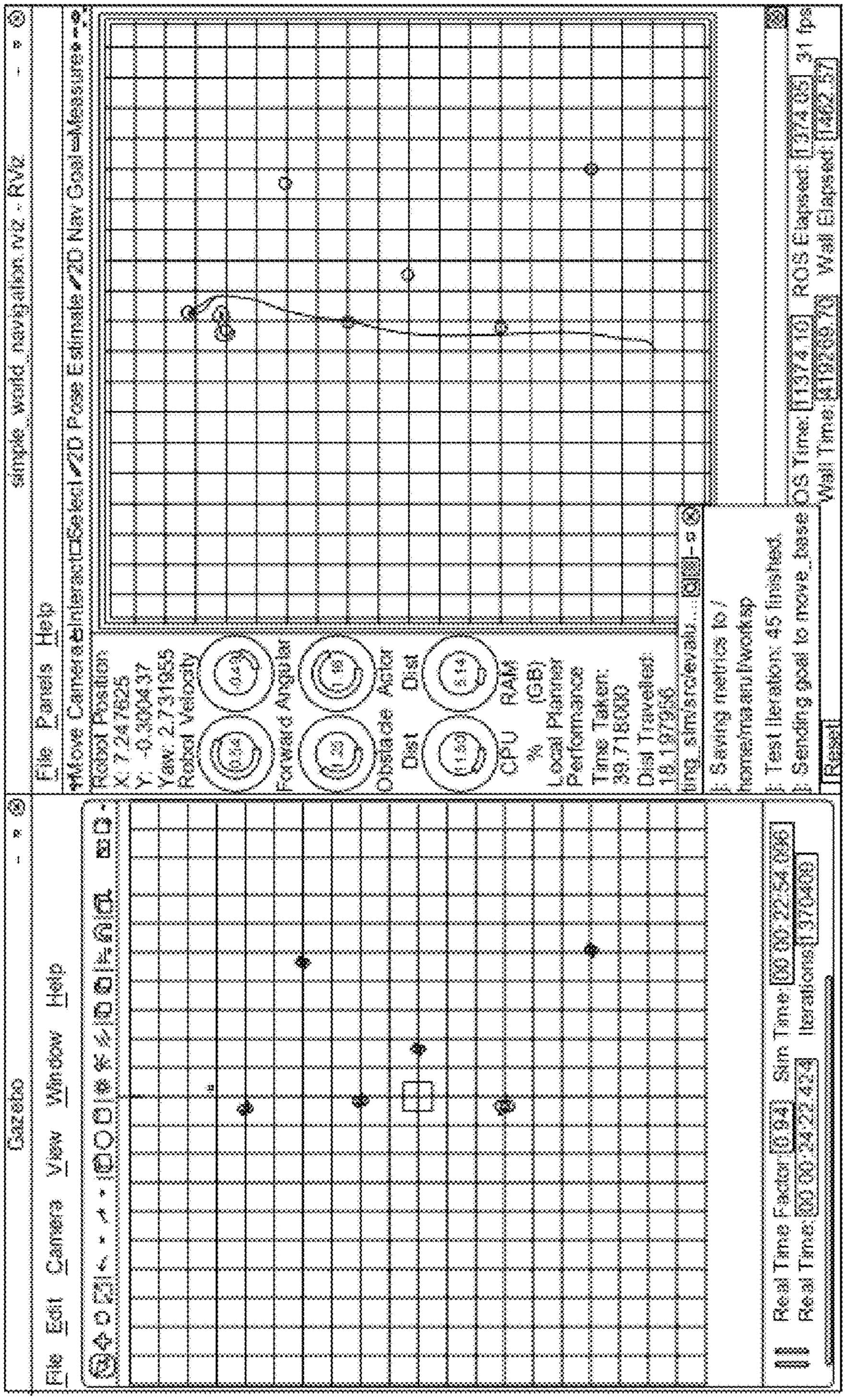

FIG. 6A and FIG. 6B illustrate exemplary screenshots 600 of a simulation of a Probabilistic Dynamic Window Approach (PDWA) with 6 dynamic obstacles in a simple area, in accordance with an embodiment of the present disclosure.

In an exemplary embodiment, the rigorous testing and evaluation of the system 102 with at least one of: one or more AI models and one or more ML models developed for social compliance are conducted, and the system 102 performance is compared with widely used local planners such as the DWA models and the TEB planner. This comprehensive testing encompassed both simulation and real-world scenarios, providing a thorough assessment of the submodules performance and reliability.

The testing objectives are twofold: to demonstrate the capabilities of at least one of: the one or more AI models and the one or more ML models in generating socially compliant paths for the one or more robotic devices 116 navigating through various environments, showcasing their effectiveness in real-world scenarios and their performance in controlled simulation settings. This comprehensive evaluation is essential for verifying the practical applicability and efficiency of the system 102 in diverse operational contexts.

In an exemplary embodiment, the simulation testing is conducted. In the simulation testing phase, a Robot Operating System (ROS) software package is developed to automate the testing process. This included the automatic launch of simulated environments and the execution of navigation models multiple times. Key performance metrics, including collision rates, goal-reaching success, path length, and average velocity, were systematically recorded as comma-separated values (CSV) files for in-depth analysis. A significant addition to this testing framework is the incorporation of the RVIZ (ROS Visualization) user interface (UI) dashboard, as shown in FIG. 6A and FIG. 6B. This RVIZ UI dashboard provided real-time visualizations of key metrics, simplifying the monitoring and evaluation of at least one or more AI models and one or more ML models performance during test execution.

In an exemplary embodiment, over 500 tests are conducted in various indoor simulated environments featuring multiple pedestrians, as developed in previous tasks. The success rates of standard navigation models, such as the DWA model and the TEB planner, with and without the probabilistic estimation subsystem 208, are summarized in Table 1.

TABLE 1

| | DWA | Probabilistic estimation subsystem + DWA | TEB | Probabilistic estimation subsystem + TEB |
|---|---|---|---|---|
| 6 Pedestrians | 49.5% | 52.6% | 47.8% | 50.8% |
| 12 Pedestrians | 19.2% | 22.95% | 22.8% | 31.77% |

Table 1 represents the success rate achieved by the DWA, the TEB, Probabilistic estimation subsystem 208+DWA, and Probabilistic estimation subsystem 208+TEB planner in two simulation environments with 6 and 12 pedestrians, respectively. The DWA and TEB planner with probabilistic estimation subsystem 208 consistently provided a higher success rate.

Numerous tunable parameters are explored to achieve optimal performance. For Probabilistic Dynamic Window Approach (PDWA) in the hybrid approach, the parameters are set as follows: pedestrian forward simulation time (dt) is set to 1.5 and clearing delay (time after which the cost map is cleared) was set to 1. These parameter configurations yielded the best results in terms of desired performance.

Figure 7A:
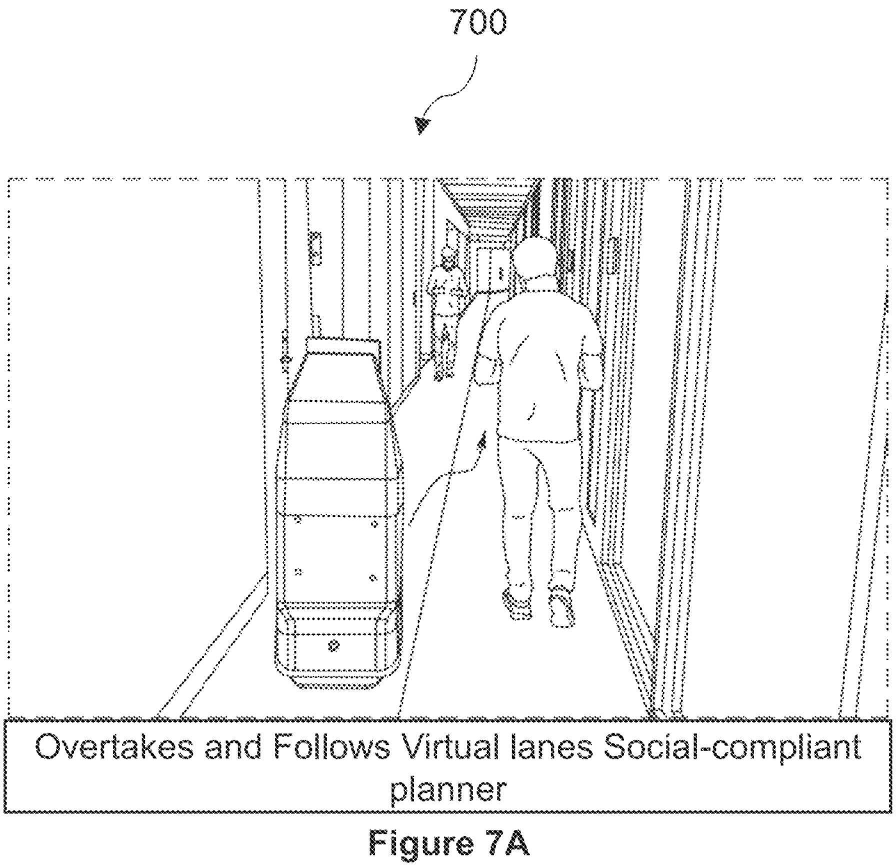
FIGS. 7A-7C illustrate exemplary real-time images in real-world scenarios of the AI-based system for autonomous navigation of the one or more robotic devices, in accordance with an embodiment of the present disclosure.
Figure 7B:
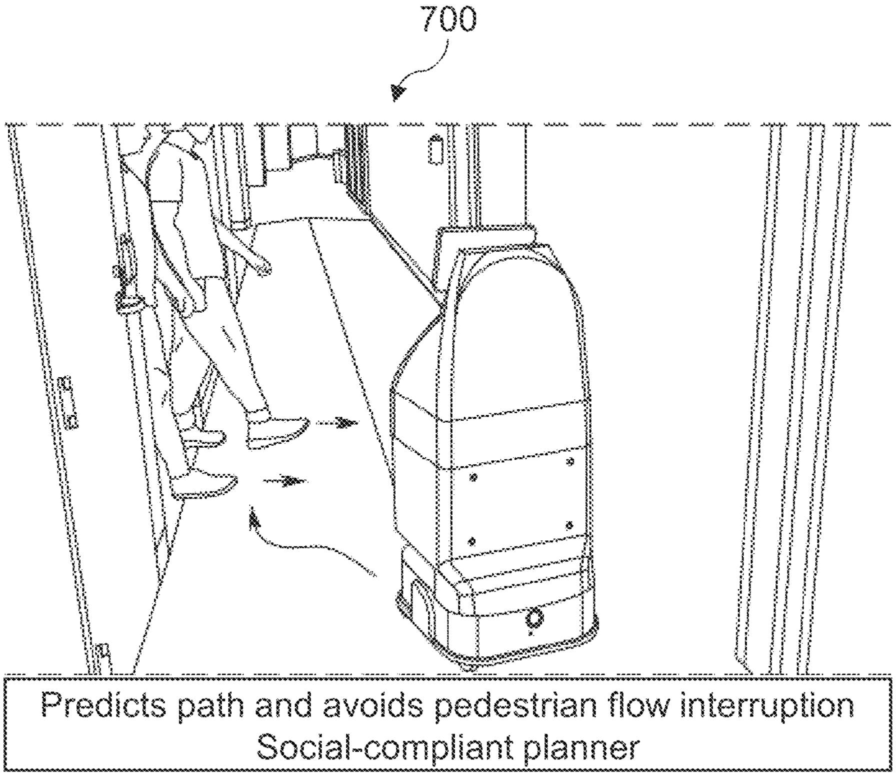
Figure 7C:
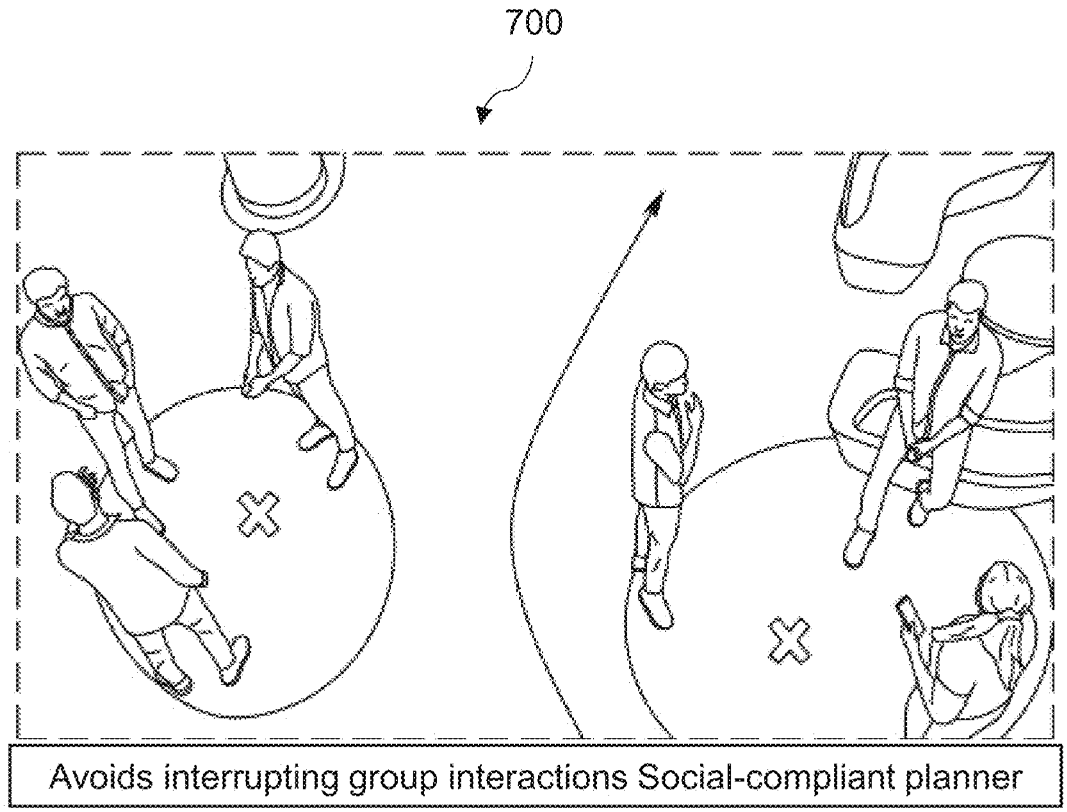

FIGS. 7A-7C illustrate exemplary real-time images 700 in real-world scenarios of the AI-based system 102 for autonomous navigation of the one or more robotic devices 116, in accordance with an embodiment of the present disclosure.

In an exemplary embodiment, through both real-world and simulated testing, it is observed significant qualitative improvements in the one or more navigation paths choice of the one or more robotic devices 116. The Probabilistic DWA effectively maneuvered the one or more robotic devices 116 through dynamic one or more objects in crowded scenarios, minimizing delays and avoiding collisions. Conversely, in sparser, social environments, the socially compliant behavior subsystem 210 ensures that the movement of the one or more robotic devices 116 are perceived as respectful and non-intrusive by the one or more objects. This hybrid approach associated with the system 102 resulted in the navigation that was not only efficient but also considerate of its surroundings, a crucial aspect in human-robot environments. The real-time images captured in diverse real-world scenarios demonstrate the adaptability and effectiveness of the developed the system 102 for autonomous navigation, showcasing its capabilities in navigating through dynamic and socially complex environments.

Figure 8A:
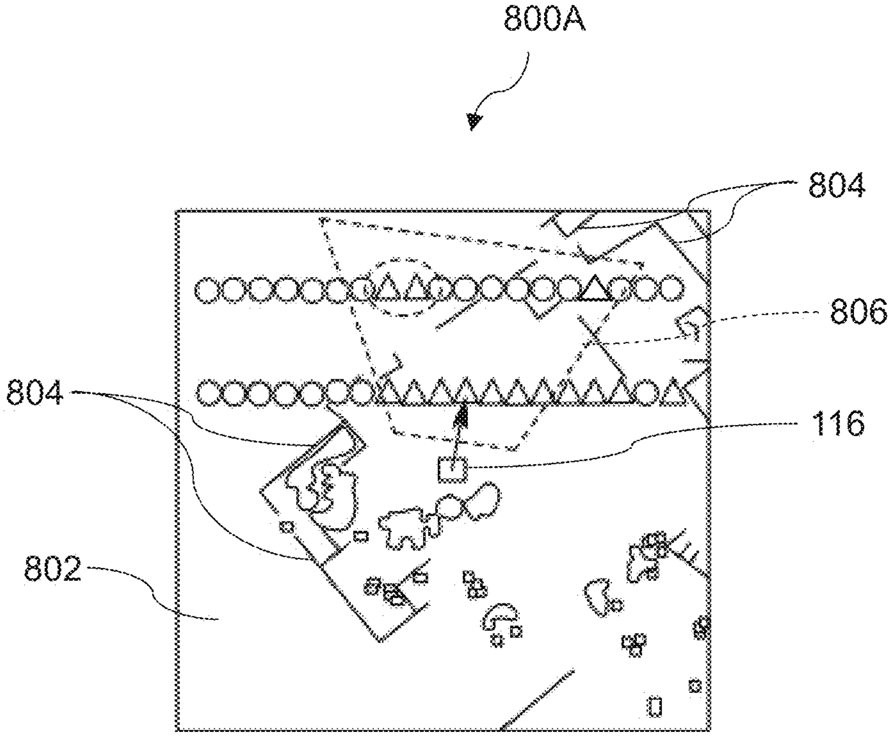
FIGS. 8A-8C illustrate exemplary visual representations depicting a two-dimensional local occupancy grid for autonomous navigation of the one or more robotic devices, in accordance with an embodiment of the present disclosure.
Figure 8B:
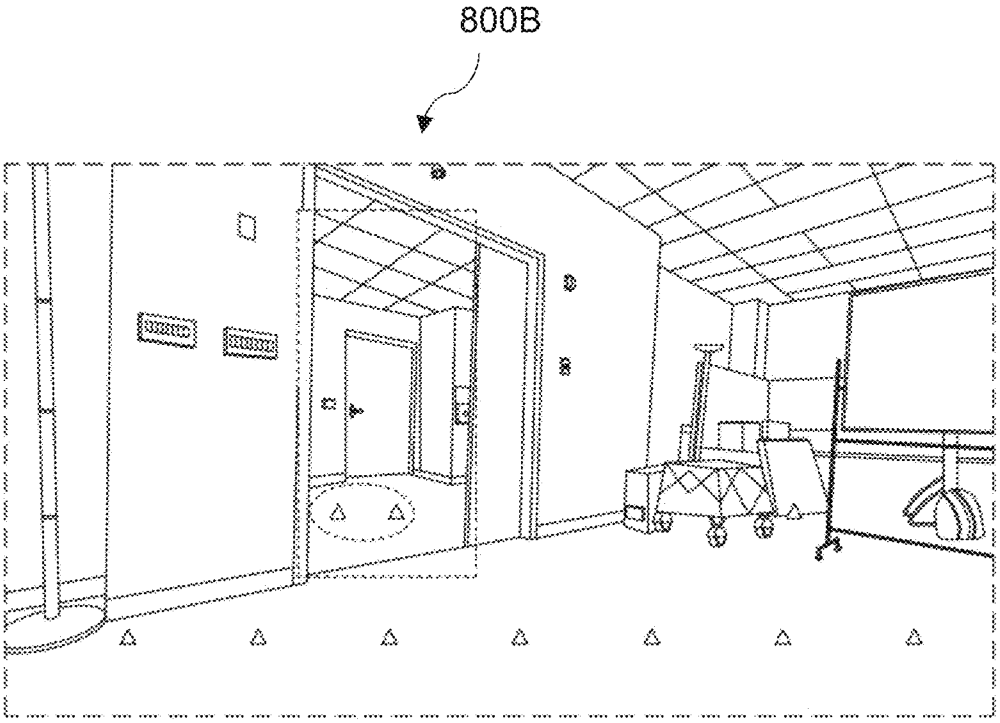
Figure 8C:
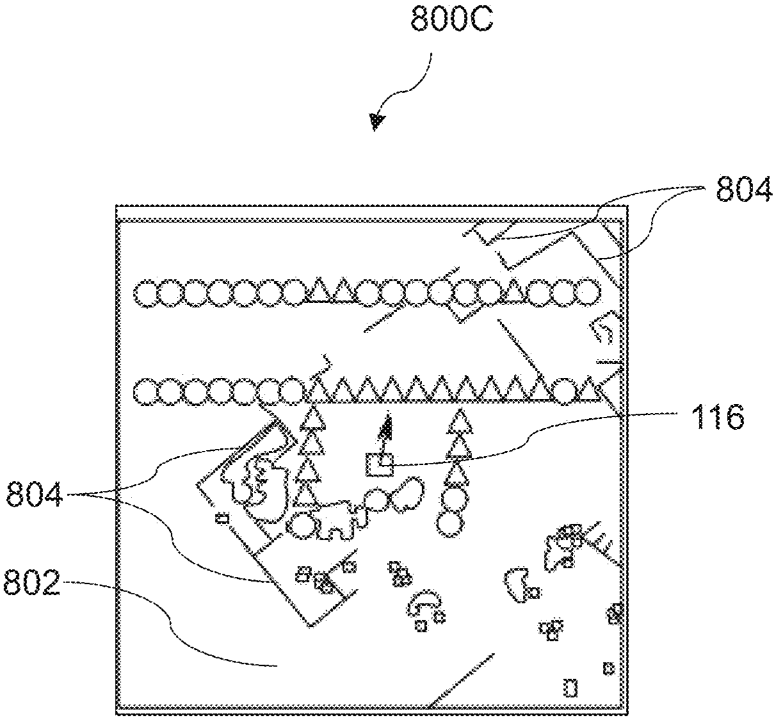

FIGS. 8A-8C illustrate exemplary visual representations (800A, 800B, and 800C) depicting the two-dimensional local occupancy grid for autonomous navigation of the one or more robotic devices 116, in accordance with an embodiment of the present disclosure.

In an exemplary embodiment, as shown in FIG. 8A, the two-dimensional local occupancy grid with one or more markers depicted as circular markers and triangular markers, and the field of view of the one or more image capturing units are projected on a two-dimensional local occupancy grid region 806. The two-dimensional local occupancy grid 800A comprises the one or more objects 804 and a free space 802 respectively, and the one or more robotic devices 116 are marked in square. The two triangular markers (circled) in a first row detect the constrained spaces of the doorway and act as the one or more waypoints that the path-planning subsystem 214 may closely follow.

The constrained space navigation subsystem 230 assists the one or more robotic devices 116 in navigating safely through the constrained spaces that highly constrict a range of motion of the one or more robotic devices 116. The constrained spaces may be, but not restricted to, at least one of: doorways, elevators, and the like, where the available free space is only slightly (~1.2-1.5×) more than a width of the one or more robotic devices 116. The discretized set of grids (as shown in FIG. 8A) provides the top-down view of the local surrounding area (5 meter (m)×5 m) of the one or more robotic devices 116 with each grid denoting a 0.05×0.05 sq. meter. The discretized set of grids represent the one or more objects 804 and the free space 802, with the location of the one or more robotic devices 116 marked as square. Such two-dimensional local occupancy grid 800A is obtained by converting the proximity values in one of: the two-dimensional scans of the one or more lidar sensors and three-dimensional point clouds using a local_costmap package within move_base. Adding rows of the one or more markers (the circular markers and the triangular circles as shown in FIG. 8A) to the discretized set of grids denote various locations in the dynamic human-centric environments around the one or more robotic devices 116. The one or more markers are spaced with a width 'w' (a tunable parameter) that depends on the width of the one or more robotic devices 116, and the different rows are spaced at 1.5 m, 3 m, and 4.5 m away from the one or more robotic devices 116 for symmetry, although these distances may be changed based on a sensing range of the one or more lidar sensors. Next, check if all the points on the line that are connecting the one or more robotic devices 116 to each marker lie in free-space 802. If yes, the corresponding marker is plotted as the triangular markers, indicating that the one or more robotic devices 116 may navigate to the triangular marker along the straight line. Otherwise, the one or more markers are plotted as the circular markers. When the one or more robotic devices 116 encounter the constrained spaces during the navigation, only few markers of the one or more markers in the rows one of: at the passage's distance and beyond may be triangular markers (as shown in FIG. 8A near a doorway). The one or more markers act as a way to detect the constrained spaces as well as the one or more waypoints that the one or more robotic devices 116 may closely follow in order to cross the constrained spaces.

To closely follow the waypoints, the cost value data is assigned to the (i, j)$^{th}$ grid around the triangular markers as demonstrated in Equation 1.

$$\mathrm{cost}(\mathrm{row}_i, col_{i,}) = \sqrt{\left((\mathrm{row}_{triangular\ marker} - \mathrm{row}_i)^2 + (col_{triangular\ marker} - col_i)^2\right)} \Big|_{(\mathrm{row}_i,\ col_i) \in F} \qquad \text{Equation 1}$$

Here, row and col represent row coordinates and column coordinates of the discretized set of grids. A subscript triangular marker and i represent the coordinate of the triangular markers, and an i$^{th}$ grid associated with the discretized set of grids around the one or more markers, and F is the set of free-space 802 around in the discretized set of grids. The cost value data is passed to the virtual cost map layer similar to the implementations of the socially compliant behavior subsystem 210. This formulation ensures that the one or more path-planning models use the virtual cost map layer that plans trajectories closest to ($\mathrm{row}_{triangular\ markers}$, $\mathrm{col}_{triangular\ markers}$) and cross the constrained spaces. Apart from the constrained spaces, the added markers also assist the one or more robotic devices 116 follow one or more natural language commands.

In an exemplary embodiment, a view of the one or more image capturing units is highlighted in the two-dimensional local occupancy grid region 806 as shown in FIG. 8A. The triangular markers in the two-dimensional local occupancy grid are also marked in the image to show the correlation between the two-dimensional local occupancy grid and the image. A dotted bounding box represents a landmark of the one or more landmarks (door in this case) inferred from the natural language command and detected by the one or more advanced vision models. The triangular markers circled (as shown in FIG. 8B) are the regions closest to the landmark.

In an exemplary embodiment, as shown in FIG. 8C, the two-dimensional local occupancy grid is added with the markers on a first side (left side) and a second side (right side) of the one or more robotic devices 116 (in square). The one or more markers assist the one or more robotic devices 116 follow the one or more directional commands extracted from the one or more natural language commands.

For instance, let's consider a natural language command of the one or more natural language commands, "Exit this room. Take a left-hand side at the corridor, and proceed until the elevator. You will find a conference room to your left. Enter it and wait." The commands processing subsystem 232 automatically infers that first to "exit the room" the one or more robotic devices 116 must look for a door. Similarly, to "proceed until the elevator", the commands processing subsystem 232 understands that the one or more robotic devices 116 must move one of: straight and forward until the landmark elevator is detected. Further, to "Enter it and wait", the one or more robotic devices 116 must again look for the door of the conference room, move straight through the door, and then stop inside. Therefore, for the natural language command, the commands processing subsystem 232 returns the following distilled list of the one or more landmarks and directions as {Landmark: Door, Direction: Left, Direction: Straight, Landmark: Elevator, Direction: Left, Landmark: Door, Direction: Straight, Direction: Stop}. The list is then passed on to the object tracking subsystem 206. The object tracking subsystem 206 is employed to detect the one or more landmarks, and follow the directions in the list. The one or more advanced vision models also includes a Gradient-Weighted Class Activation Mapping (GradCAM) model to detect the location of landmark within colored image data provided by the one or more image capturing units. The output of the one or more advanced vision models is a bounding box over the one or more landmarks in the image data (the dotted bounding box as shown in FIG. 8B). Next, a landmark bounding box is transformed into a real-world location for the one or more robotic devices 116 to navigate to. Therefore, the one or more advanced vision models correlate the fields of view of the one or more image capturing units and the discretized set of grids plotted with the one or more markers (as shown in FIG. 8A). This is achieved by projecting the image data onto the two-dimensional local occupancy grid region 806 (a dotted trapezoid region as shown in FIG. 8A) using homography transformations. The one or more markers in the image data also localize the regions "closest" to the landmark bounding box. For instance, in FIG. 8B, the two triangular markers within the landmark bounding box of the door are the closest in the pixel space to the landmark: door. Therefore, the one or more markers are considered as one of: the one or more waypoints and local goals for the one or more robotic devices 116 to follow. Similarly, to follow one or more directional commands on the list, a new set of markers in the two-dimensional local occupancy grid is added. The one or more directional commands are extracted from the one or more natural language commands. A row of markers on both sides are added, equidistant from the one or more robotic devices 116 (the triangular markers and the circular markers as shown in FIG. 8C). The one or more markers are added in-front of the one or more robotic devices 116, by checking for the one or more objects 804. When the one or more robotic devices 116 execute a directional command of the one or more directional commands, the object tracking subsystem 206 selects the triangular markers from a first row (left row). If several triangular markers exist, the object tracking subsystem 206 selects the one or more markers based on Equation 2.

$$(\mathrm{row}^*_{triangular\ markers}, col^*_{triangular\ markers}) = \operatorname{argmax}\left(\min\left(dist\left((\mathrm{row}_{triangular\ markers}, col_{triangular\ markers}), \bar{F}\right)\right)\right) \quad \forall\ (\mathrm{row}_{triangular\ markers}, col_{triangular\ markers}) \in F \qquad \text{Equation 2}$$

In Equation 2, dist(•) is a distance function, and \bar{F} denotes the one or more objects space. The condition enforces the object tracking subsystem 206 to pick the triangular markers in the two-dimensional local occupancy grid that is configured with an optimal sub-optimal distance from the one or more objects. Using the one or more markers (that are real-world locations) from the one or more landmarks and direction identifiers as one of: the one or more waypoints and the local goals, the one or more path-planning models are configured to plan the one or more navigation paths. The cost value data from the probabilistic estimation subsystem 208, the socially compliant behavior subsystem 210, and the constrained space navigation subsystem 230 are employed as a local planner that computes local trajectories.

Figure 9:
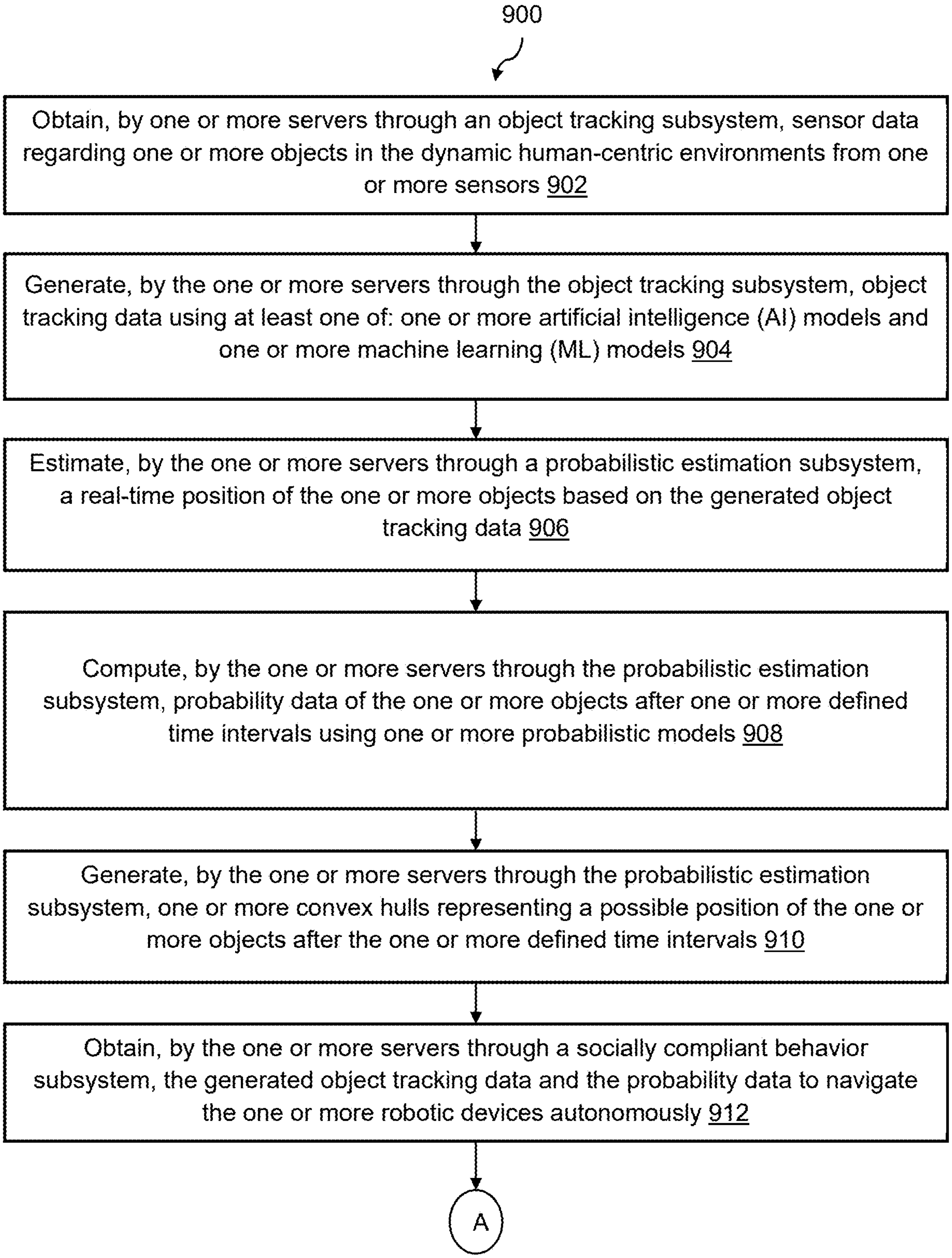
FIG. 9 illustrates an exemplary flow chart of an AI-based method for autonomous navigation of one or more robotic devices in dynamic human-centric environments, in accordance with an embodiment of the present disclosure.
Figure 9:
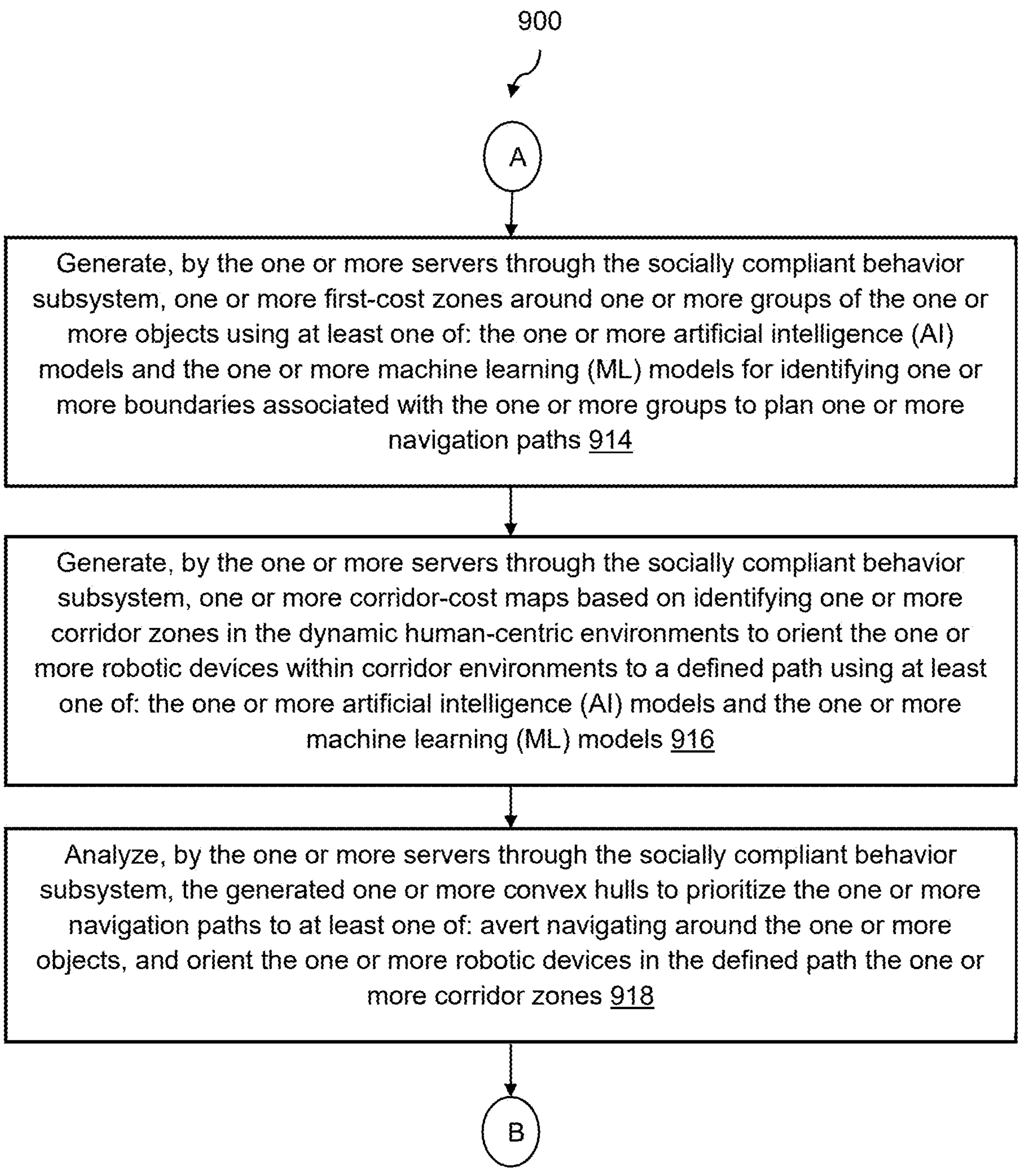

FIG. 9 illustrates an exemplary flow chart of an AI-based method 900 for autonomous navigation of one or more robotic devices 116 in dynamic human-centric environments, in accordance with an embodiment of the present disclosure.

In accordance with an embodiment of the present disclosure, an AI-based method 900 for autonomous navigation of one or more robotic devices 116 in dynamic human-centric environments is disclosed. At step 902, the AI-based method 900 includes obtaining, by the one or more servers through the object tracking subsystem, sensor data regarding one or more objects in the dynamic human-centric environments from the one or more sensors. The one or more sensors comprise at least one of: the one or more lidar sensors, the one or more image capturing units, the one or more depth sensors, the one or more inertial measurement units (IMUs), the one or more proximity sensors, and the like.

At step 904, the AI-based method 900 includes generating, by the one or more servers through the object tracking subsystem, object tracking data using at least one of: the one or more AI models and one or more ML models. The generated object tracking data involves processing the sensor data using the leg tracking model to detect and track the one or more objects around the one or more robotic devices.

At step 906, the AI-based method 900 includes estimating, by the one or more servers through the probabilistic estimation subsystem, the real-time position of the one or more objects based on the generated object tracking data. The estimation of the real-time position of the one or more objects comprises: a) applying the Kalman filter to determine at least one of: the real-time position and velocity of the one or more objects by performing the motion prediction step and the correction step based on the sensor data, b) computing the one or more convex hulls over the one or more defined time intervals, each defined time interval of the one or more defined time intervals is subdivided into smaller resolutions, to dynamically update the virtual cost map layer with varying levels of prediction certainty, c) associating the one or more convex hulls with the cost value data based on the varying levels of prediction certainty, with the one or more first certainty regions are assigned the first cost data within the cost value data and the one or more second certainty regions are assigned the second cost data within the cost value data. The cost value data influences path-planning decisions for autonomous navigation, and d) estimating the state of the one or more objects in at least one of: the cartesian coordinate systems and the polar coordinate systems, including one or more parameters comprising at least one of: the radial distance, the radial angle, and the angular velocity.

At step 908, the AI-based method 900 includes computing, by the one or more servers through the probabilistic estimation subsystem, the probabilistic position data of the one or more objects after the one or more defined time intervals using the one or more probabilistic models. At step 910, the AI-based method 900 includes generating, by the one or more servers through the probabilistic estimation subsystem, the one or more convex hulls representing the possible position of the one or more objects after the one or more defined time intervals.

At step 912, the AI-based method 900 includes obtaining, by the one or more servers through the socially compliant behavior subsystem, the generated object tracking data and the probabilistic position data to navigate the one or more robotic devices autonomously. At step 914, the AI-based method 900 includes generating, by the one or more servers through the socially compliant behavior subsystem, the one or more first-cost zones around the one or more groups of the one or more objects using at least one of: the one or more AI models and the one or more ML models for identifying one or more boundaries associated with the one or more groups to plan one or more navigation paths. The one or more first-cost zones generation involves applying the clustering model, including the DBSCAN to group the one or more objects based on the spatial density and delineate the one or more boundaries of the one or more groups in the dynamic human-centric environments.

At step 916, the AI-based method 900 includes generating, by the one or more servers through the socially compliant behavior subsystem, one or more corridor-cost maps based on identifying one or more corridor zones in the dynamic human-centric environments to orient the one or more robotic devices within corridor environments to a defined path using at least one of: the one or more AI models and the one or more ML models. The one or more corridor-cost maps are generated based on the yaw orientation of the one or more robotic devices relative to the corridor environments, and biasing navigation to the defined path to emulate natural pedestrian behavior.

At step 918, the AI-based method 900 includes analyzing, by the one or more servers through the socially compliant behavior subsystem, the generated one or more convex hulls to prioritize the one or more navigation paths to at least one of: avert navigating around the one or more objects and orient the one or more robotic devices in the defined path of the one or more corridor zones. Analyzing the generated one or more convex hulls comprises prioritizing the one or more navigation paths that pass behind the one or more objects to avert navigating in front of moving one or more objects, based on the analysis of the one or more convex hulls.

At step 920, the AI-based method 900 includes generating, by the one or more servers through the constrained space navigation subsystem, the one or more waypoints for the one or more robotic devices. The one or more waypoints are generated by detecting the constrained spaces in the dynamic human-centric environments. The constrained space navigation subsystem analyzes the sensor data to identify the constrained spaces. The one or more waypoints are crucial for guiding the one or more robotic devices through areas with limited movement space, thereby improving overall navigation performance.

At step 922, the AI-based method 900 includes extracting, by the one or more servers through the commands processing subsystem, the one or more navigational insights from the one or more natural language commands provided by the one or more users. By analyzing the one or more natural language commands, the commands processing subsystem identifies key navigational instructions, such as directions, destinations, and specific tasks the one or more users want the one or more robotic devices to perform.

At step 924, the AI-based method 900 includes obtaining, by the one or more servers through the virtual cost-map layer subsystem, the cost value data from at least one of: the one or more convex hulls, the one or more first-cost zones, the one or more corridor-cost maps, the one or more waypoints, and the one or more navigational insights.

At step 926, the AI-based method 900 includes analyzing, by the one or more servers through a path-planning subsystem, the virtual cost map layer with one or more path-planning models for real-time local path-planning. Analyzing the virtual cost map layer comprises applying at least one of: a dynamic window approach DWA model and the TEB planner, to adaptively select the one or more navigation paths in real-time based on the virtual cost map layer.

At step 928, the AI-based method 900 includes adaptively selecting, by the one or more servers through the path-planning subsystem, the one or more navigation paths based on at least one of: the sensor data, the object tracking data, the probabilistic position data, the one or more waypoints, the one or more navigational insights, and the virtual cost map layer for deployment to the one or more robotic devices, enabling autonomous navigation in the dynamic human-centric environments.

Figure 10:
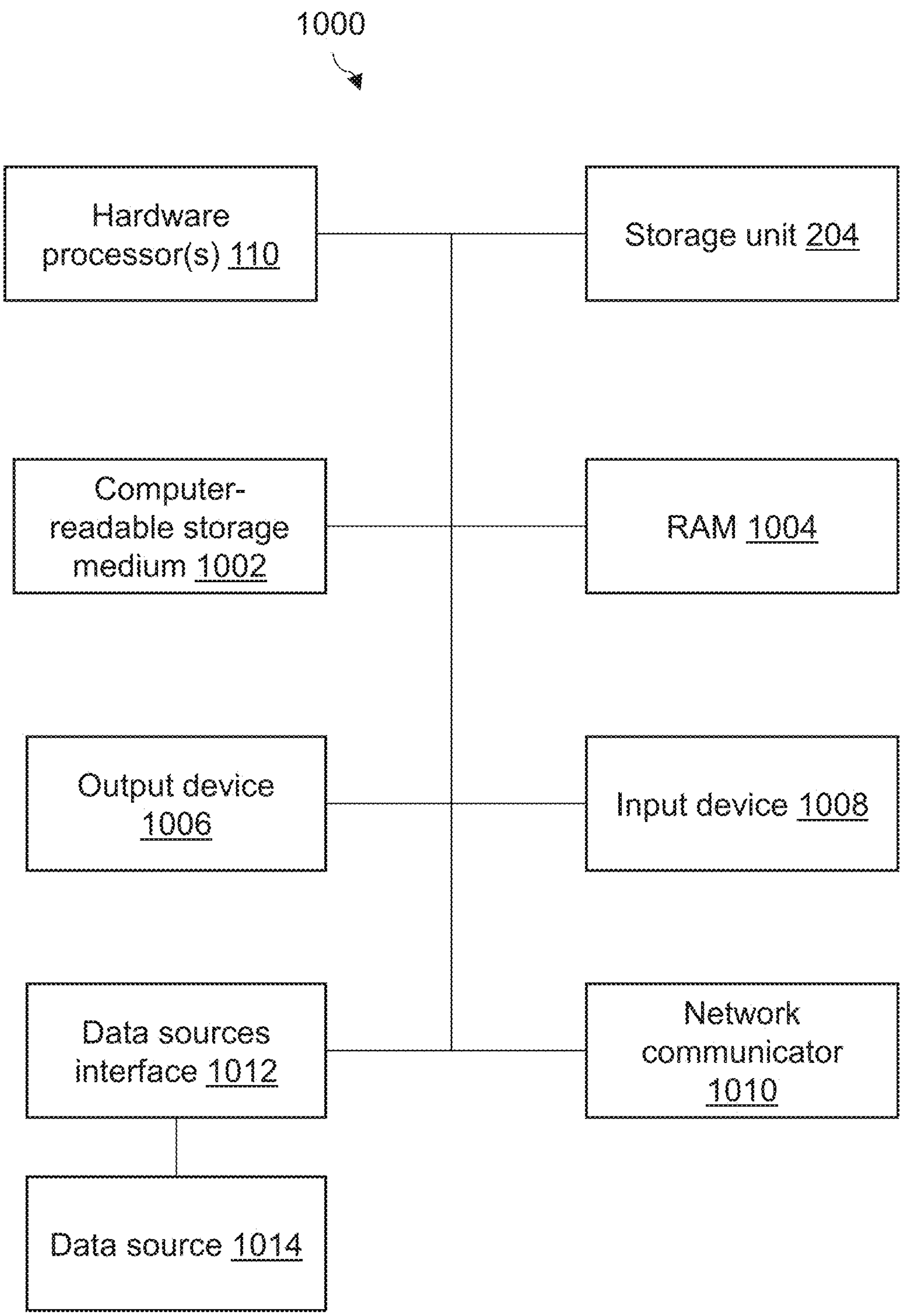
FIG. 10 illustrates an exemplary block diagram representation of one or more server platforms for implementation of the disclosed AI-based system, in accordance with an embodiment of the present disclosure.

FIG. 10 illustrates an exemplary block diagram representation of one or more server platforms 1000 for implementation of the disclosed AI-based system 102, in accordance with an embodiment of the present disclosure.

In an exemplary embodiment, for the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the one or more server platforms 1000. As illustrated, the one or more server platforms 1000 may include additional components not shown, and some of the components described may be removed and/or modified. For example, a computer system with the multiple graphics processing units (GPUs) may be located on at least one of: internal printed circuit boards (PCBs) and external-cloud platforms including Amazon® Web Services (AWS), Google® Cloud Platform (GCP) Microsoft® Azure (Azure), internal corporate cloud computing clusters, or organizational computing resources.

The one or more server platforms 1000 may be a computer system such as the system 102 that may be used with the embodiments described herein. The computer system may represent a computational platform that includes components that may be in the one or more servers 118 or another computer system. The computer system may be executed by the one or more hardware processors 110 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the one or more hardware processors 110 that execute software instructions or code stored on a non-transitory computer-readable storage medium 1002 to perform methods of the present disclosure. The software code includes, for example, instructions to gather data and analyze the network environment data. For example, the plurality of subsystems 114 includes the object tracking subsystem 206, the probabilistic estimation subsystem 208, the socially compliant behavior subsystem 210, the constrained space navigation subsystem 230, the commands processing subsystem 232, the virtual cost-map layer subsystem 212, the path-planning subsystem 214, and the two-dimensional local occupancy grid generator subsystem 216.

The instructions on the computer-readable storage medium 1002 are read and stored the instructions in the storage unit or random-access memory (RAM) 1004. The storage unit 204 may provide a space for keeping static data where at least some instructions could be stored for later execution. The stored instructions may be further compiled to generate other representations of the instructions and dynamically stored in the RAM 1004. The one or more hardware processors 110 may read instructions from the RAM 1004 and perform actions as instructed.

The computer system may further include an output device 1006 to provide at least some of the results of the execution as output including, but not limited to, navigation outputs of the one or more robotic devices. The output device 1006 may include the one or more robotic devices themselves, such that the generated instructions for navigation, path-planning, and obstacle avoidance are executed by the robotic devices. These instructions may include movement commands, positional updates, or interaction prompts based on the socially compliant behaviors determined by the AI-based system. The computer system may further include an input device 1008 to provide the one or more robotic devices or another device with mechanisms for transferring data and/or otherwise interacting with the computer system. The input device 1008 may include, for example, the one or more sensors such as LiDAR, cameras, and depth sensors for capturing environmental data in real-time. The one or more sensors supply critical inputs to the system, such as object detection, object tracking, and human presence recognition. Each of these output devices 1006 and input device 1008 may be joined by one or more additional peripherals.

A network communicator 1010 may be provided to connect the computer system to a network and in turn to other devices connected to the network including other entities, servers, data stores, and interfaces. The network communicator 1010 may include, for example, a network adapter such as a LAN adapter or a wireless adapter. The computer system may include a data sources interface 1012 to access a data source 1014. The data source 1014 may be an information resource about the one or more generative AI models. As an example, the database 104 of exceptions and rules may be provided as the data source 1014. Moreover, knowledge repositories and curated data may be other examples of the data source 1014. The data source 1014 may include libraries containing, but not limited to, datasets related to the one or more AI models, the AI model configurations, historical data, and other essential information. Moreover, the data sources interface 712 enables the system 102 to dynamically access and update these data repositories as latest information is collected, analyzed, and utilized.

Numerous advantages of the present disclosure may be apparent from the discussion above. In accordance with the present disclosure, the system for autonomous navigation of robotic devices in diverse environments, with a focus on enhancing efficiency, safety, and adaptability. The Probabilistic DWA component enables efficient and dynamic maneuvering of the one or more robotic devices in crowded and dynamic environments. The system effectively navigates through complex scenarios, minimizing delays and optimizing paths to avoid collisions. The integration of the socially compliant behavior subsystem ensures that the one or more robotic devices exhibit respectful and non-intrusive behavior in social environments. This is crucial for human-robot interaction, fostering a sense of safety and comfort in shared spaces. The hybrid approach allows the navigation system to adapt to diverse and changing environments. Whether in crowded urban settings or sparser social spaces, the system can dynamically adjust its behavior to suit the specific context. The system is configured to make real-time decisions, informed by probabilistic estimation and social compliance, which enhances the overall responsiveness of the one or more robotic devices. This is essential for ensuring timely and safe navigation. The system is intelligent enough to follow high-level human commands while also exhibiting safe, pedestrian-friendly navigation behaviors, and handling challenges such as the constrained spaces in dense indoor environments, A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. An artificial intelligence (AI)-based method for autonomous navigation of one or more robotic devices in dynamic human-centric environments, comprising:

obtaining, by one or more servers through an object tracking subsystem, sensor data regarding one or more objects in the dynamic human-centric environments from one or more sensors;

generating, by the one or more servers through the object tracking subsystem, object tracking data based on analyzing the sensor data using at least one of: one or more artificial intelligence (AI) models and one or more machine learning (ML) models;

estimating, by the one or more servers through a probabilistic estimation subsystem, a real-time position of the one or more objects based on the generated object tracking data;

computing, by the one or more servers through the probabilistic estimation subsystem, probabilistic position data of the one or more objects after one or more defined time intervals using one or more probabilistic models;

generating, by the one or more servers through the probabilistic estimation subsystem, one or more convex hulls for the one or more objects, wherein each convex hull representing a certainty region that defines spatial boundaries of at least one of:

the one or more objects and groups of objects detected within the dynamic human- centric environments over a defined future time interval, the spatial boundaries encompassing a set of points in a two-dimensional space, wherein the convex hulls are computed using the sensor data obtained from the one or more sensors and predicted states with associated covariance values;

associating each certainty region of the one or more convex hulls with a cost value based on its corresponding level of prediction certainty, wherein certainty regions with higher prediction certainty are assigned higher cost values, and certainty regions with lower prediction certainty are assigned lower cost values, and wherein the cost value data influences path-planning decisions for autonomous navigation; and updating, by the probabilistic estimation subsystem, a virtual cost-map layer with the cost value data associated with the one or more convex hulls;

obtaining, by the one or more servers through a socially compliant behavior subsystem, the generated object tracking data and the probabilistic position data to navigate the one or more robotic devices autonomously;

generating, by the one or more servers through the socially compliant behavior subsystem, one or more high-cost zones around one or more groups of the one or more objects using at least one of: the one or more artificial intelligence (AI) models and the one or more machine learning (ML) models for identifying one or more boundaries associated with the one or more groups to plan one or more navigation paths, wherein the one or more high-cost zones represent spatial areas assigned elevated navigation costs due to obstacles, densely populated regions, and socially sensitive zones including at least one of: human groups and the one or more robotic devices;

generating, by the one or more servers through the socially compliant behavior subsystem, one or more corridor-cost maps based on identifying one or more corridor zones in the dynamic human-centric environments to orient the one or more robotic devices within corridor environments to a defined path using at least one of: the one or more artificial intelligence (AI) models and the one or more machine learning (ML) models;

analyzing, by the one or more servers through the socially compliant behavior subsystem, the generated one or more convex hulls to prioritize the one or more navigation paths to at least one of: avert navigating around the one or more objects, and orient the one or more robotic devices in the defined path the one or more corridor zones, wherein analyzing the generated one or more convex hulls comprises:

prioritizing the one or more navigation paths that pass behind the one or more objects to avert navigating in front of moving the one or more objects, based on the analysis of the one or more convex hulls;

generating, by the one or more servers through a constrained space navigation subsystem, one or more waypoints for the one or more robotic devices based on detecting constrained spaces in the dynamic human-centric environments by analyzing the sensor data;

extracting, by the one or more servers through a commands processing subsystem, one or more navigational insights based on processing one or more natural language commands obtained from one or more users;

obtaining, by the one or more servers through the virtual cost-map layer subsystem, cost value data from at least one of: the one or more convex hulls, the one or more high-cost zones, the one or more corridor-cost maps, the one or more waypoints, and the one or more navigational insights;

analyzing, by the one or more servers through a path-planning subsystem, the virtual cost map layer with one or more path-planning models for real-time local path-planning; and adaptively selecting, by the one or more servers through the path-planning subsystem, the one or more navigation paths based on at least one of: the sensor data, the object tracking data, the probabilistic position data, the one or more waypoints, the one or more navigational insights, and the virtual cost map layer for deployment to the one or more robotic devices, enabling autonomous navigation in the dynamic human-centric environments.

2. The artificial intelligence (AI)-based method of claim 1, wherein the one or more sensors comprise at least one of: one or more lidar sensors, one or more image capturing units, one or more depth sensors, one or more inertial measurement units (IMUs), and one or more proximity sensors.

3. The artificial intelligence (AI)-based method of claim 1, wherein generating the object tracking data comprises:

processing the sensor data using a leg tracking model as at least one of: the one or more artificial intelligence (AI) models and the one or more machine learning (ML) models, to detect and track the one or more objects around the one or more robotic devices.

4. The artificial intelligence (AI)-based method of claim 1, wherein estimating the real-time position of the one or more objects comprises:

applying a Kalman filter as the one or more probabilistic models, to determine at least one of: the real-time position and a velocity of the one or more objects by performing a motion prediction step and a correction step based on the sensor data.

5. The artificial intelligence (AI)-based method of claim 1, wherein estimating the real-time position of the one or more objects comprises:

estimating a state of the one or more objects in at least one of: cartesian coordinate systems and polar coordinate systems, including one or more parameters comprising at least one of: a radial distance, a radial angle, and an angular velocity.

6. The artificial intelligence (AI)-based method of claim 1, comprising:

generating, by the one or more servers through a two-dimensional local occupancy grid generator subsystem, a discretized set of grids to provide a top-down view of the dynamic human-centric environments of the one or more robotic devices; and mapping, by the one or more servers through the constrained space navigation subsystem, the generated one or more waypoints in the discretized set of grids to autonomously navigate the one or more robotic devices in the dynamic human-centric environments.

7. The artificial intelligence (AI)-based method of claim 1, processing, by the one or more servers through the commands processing subsystem, the one or more natural language commands using speech-to-text model to convert the one or more natural language commands into textual data;

parsing, by the one or more servers through the commands processing subsystem, the textual data using a language processing model to infer and extract the one or more navigational insights;

mapping, by the one or more servers through the commands processing subsystem, the extracted one or more navigational insights in the discretized set of grids; and detecting, by the one or more servers through the object tracking subsystem, one or more landmarks in the discretized set of grids based on the mapped one or more navigational insights using at least one of: one or more object detection models comprise you only look once (YOLO) and one or more vision language models comprise contrastive language-image pre-training (CLIP).

8. The artificial intelligence (AI)-based method of claim 1, wherein generating the one or more high-cost zones comprises:

applying one or more clustering models, such as Density-Based Spatial Clustering of Applications with Noise (DBSCAN) as at least one of: the one or more artificial intelligence (AI) models and the one or more machine learning (ML) models, to group the one or more objects based on spatial density and delineate the one or more boundaries of the one or more groups in the dynamic human-centric environments.

9. The artificial intelligence (AI)-based method of claim 1, wherein generating the one or more corridor-cost maps comprises:

generating the one or more corridor-cost maps based on a yaw orientation of the one or more robotic devices relative to the corridor environments, and biasing navigation to the defined path that is one of: a left side of corridor and a right side of corridor to emulate natural pedestrian behavior.

10. The artificial intelligence (AI)-based method of claim 1, wherein analyzing the virtual cost map layer comprises:

applying at least one of: a dynamic window approach (DWA) model and a Timed Elastic Band (TEB) planner as the one or more path-planning models, to adaptively select the one or more navigation paths in real-time based on the virtual cost map layer.

11. An artificial intelligence (AI)-based system for autonomous navigation of one or more robotic devices in dynamic human-centric environments, comprising:

one or more servers, comprising:

one or more hardware processors; and a memory unit operatively connected to the one or more hardware processors, wherein the memory unit comprises a set of computer-readable instructions in form of a plurality of subsystems, configured to be executed by the one or more hardware processors, wherein the plurality of subsystems comprises:

an object tracking subsystem configured to obtain sensor data regarding one or more objects in the dynamic human-centric environments from one or more sensors for generating object tracking data using at least one of: one or more artificial intelligence (AI) models and one or more machine learning (ML) models;

a probabilistic estimation subsystem configured to:

obtain the generated object tracking data to estimate a real-time position of the one or more objects;

compute probabilistic position data of the one or more objects after one or more defined time intervals using one or more probabilistic models; and generate one or more convex hulls for the one or more objects, wherein each convex hull representing a certainty region that defines spatial boundaries of at least one of: the one or more objects and groups of objects detected within the dynamic human-centric environments over a defined future time interval, the spatial boundaries encompassing a set of points in a two-dimensional space, wherein the convex hulls are computed using the sensor data obtained from the one or more sensors and predicted states with associated covariance values;

associate each certainty region of the one or more convex hulls with a cost value based on its corresponding level of prediction certainty, wherein certainty regions with higher prediction certainty are assigned higher cost values, and certainty regions with lower prediction certainty are assigned lower cost values, and wherein the cost value data influences path-planning decisions for autonomous navigation; and update a virtual cost-map layer with the cost value data associated with the one or more convex hulls;

a socially compliant behavior subsystem configured to:

obtain the generated object tracking data and the probabilistic position data to navigate the one or more robotic devices autonomously;

generate one or more high-cost zones around one or more groups of the one or more objects using at least one of: the one or more artificial intelligence (AI) models and the one or more machine learning (ML) models for identifying one or more boundaries associated with the one or more groups to plan one or more navigation paths, wherein the one or more high-cost zones represent spatial areas assigned elevated navigation costs due to obstacles, densely populated regions, and socially sensitive zones including at least one of: human groups and the one or more robotic devices;

generate one or more corridor-cost maps based on identifying one or more corridor zones in the dynamic human-centric environments to orient the one or more robotic devices within corridor environments to a defined path using at least one of: the one or more artificial intelligence (AI) models and the one or more machine learning (ML) models; and analyze the generated one or more convex hulls to prioritize the one or more navigation paths to at least one of: avert navigating around the one or more objects and orient the one or more robotic devices in the defined path in the one or more corridor zones, wherein analyzing the generated one or more convex hulls comprises:

prioritizing the one or more navigation paths that pass behind the one or more objects to avert navigating in front of moving the one or more objects, based on the analysis of the one or more convex hulls;

a constrained space navigation subsystem configured to generate one or more waypoints for the one or more robotic devices based on detecting constrained spaces in the dynamic human-centric environments by analyzing the sensor data;

a commands processing subsystem configured to extract one or more navigational insights based on processing one or more natural language commands obtained from one or more users;

a virtual cost-map layer subsystem configured to:

obtain cost value data from at least one of: the one or more convex hulls, the one or more high-cost zones, the one or more corridor-cost maps, the one or more waypoints, and the one or more navigational insights, for generating a virtual cost map layer to navigate the one or more robotic devices; and a path-planning subsystem configured to:

analyze the virtual cost map layer with one or more path-planning models for real-time local path-planning; and adaptively select the one or more navigation paths based on at least one of: the sensor data, the object tracking data, the probabilistic position data, the one or more waypoints, the one or more navigational insights, and the virtual cost map layer for deployment to the one or more robotic devices, enabling autonomous navigation in the dynamic human-centric environments.

12. The artificial intelligence (AI)-based system of claim 11, wherein the object tracking subsystem is configured with a leg tracking model as at least one of: the one or more artificial intelligence (AI) models and the one or more machine learning (ML) models, to process the sensor data for detecting and tracking the one or more objects around the one or more robotic devices.

13. The artificial intelligence (AI)-based system of claim 11, wherein the probabilistic estimation subsystem is configured with a Kalman filter as one or more probabilistic models, the Kalman filter configured to determine at least one of: the real-time positions and velocity, of the one or more objects by performing a motion prediction step and a correction step based on the sensor data.

14. The artificial intelligence (AI)-based system of claim 11, wherein the probabilistic estimation subsystem is configured to compute the one or more convex hulls over the one or more defined time intervals, each defined time interval of the one or more defined time intervals subdivided into smaller resolutions, to dynamically update the virtual cost map layer with varying levels of prediction certainty.

15. The artificial intelligence (AI)-based system of claim 11, wherein the socially compliant behavior subsystem comprises a group detection and avoidance module, a corridor navigation module, and a crossing navigation module, the group detection and avoidance module is configured with a clustering model, including a Density-Based Spatial Clustering of Applications with Noise (DBSCAN) as at least one of: the one or more artificial intelligence (AI) models and the one or more machine learning (ML) models; and the Density-Based Spatial Clustering of Applications with Noise (DBSCAN) configured to group the one or more objects based on spatial density and delineate the one or more boundaries of the one or more groups in the dynamic human-centric environments;

the corridor navigation module is configured to generate the one or more corridor-cost maps based on a yaw orientation of the one or more robotic devices relative to the corridor environments, and biases navigation to the defined path to emulate natural pedestrian behavior.

16. The artificial intelligence (AI)-based system of claim 11, wherein the plurality of subsystems comprises a two-dimensional local occupancy grid generator subsystem, the two-dimensional local occupancy grid generator subsystem configured to:

provide a top-down view of the dynamic human-centric environments of the one or more robotic devices as a discretized set of grids;

define a plurality of attributes to the one or more objects and free space in the discretized set of grids; and determine the position of the one or more robotic devices within the discretized set of grids based on the plurality of attributes.

17. A non-transitory computer-readable storage medium storing computer-executable instructions that, when executed by one or more hardware processors, cause the one or more hardware processors to perform operations for autonomous navigation of one or more robotic devices in dynamic human-centric environments, the operations comprising:

obtaining sensor data regarding one or more objects in the dynamic human-centric environments from one or more sensors;

generating object tracking data based on analyzing the sensor data using at least one of: one or more artificial intelligence (AI) models and one or more machine learning (ML) models;

estimating a real-time position of the one or more objects based on the generated object tracking data;

computing probabilistic position data of the one or more objects after one or more defined time intervals using one or more probabilistic models;

generating one or more convex hulls for the one or more objects, wherein each convex hull representing a certainty region that defines spatial boundaries of at least one of: the one or more objects and groups of objects detected within the dynamic human-centric environments over a defined future time interval, the spatial boundaries encompassing a set of points in a two-dimensional space, wherein the convex hulls are computed using the sensor data obtained from the one or more sensors and predicted states with associated covariance values;

associating each certainty region of the one or more convex hulls with a cost value based on its corresponding level of prediction certainty, wherein certainty regions with higher prediction certainty are assigned higher cost values, and certainty regions with lower prediction certainty are assigned lower cost values, and wherein the cost value data influences path-planning decisions for autonomous navigation; and updating, by the probabilistic estimation subsystem, a virtual cost-map layer with the cost value data associated with the one or more convex hulls;

obtaining the generated object tracking data and the probabilistic position data to navigate the one or more robotic devices autonomously;

generating one or more high-cost zones around one or more groups of the one or more objects using at least one of: the one or more artificial intelligence (AI) models and the one or more machine learning (ML) models for identifying one or more boundaries associated with the one or more groups to plan one or more navigation paths, wherein the one or more high-cost zones represent spatial areas assigned elevated navigation costs due to obstacles, densely populated regions, and socially sensitive zones including at least one of: human groups and the one or more robotic devices;

generating one or more corridor-cost maps based on identifying one or more corridor zones in the dynamic human-centric environments to orient the one or more robotic devices within corridor environments to a defined path using at least one of: the one or more artificial intelligence (AI) models and the one or more machine learning (ML) models;

analyzing the generated one or more convex hulls to prioritize the one or more navigation paths to at least one of: avert navigating around the one or more objects, and orient the one or more robotic devices in the defined path of the one or more corridor zones, wherein analyzing the generated one or more convex hulls comprises:

prioritizing the one or more navigation paths that pass behind the one or more objects to avert navigating in front of moving the one or more objects, based on the analysis of the one or more convex hulls;

generating one or more waypoints for the one or more robotic devices based on detecting constrained spaces in the dynamic human-centric environments by analyzing the sensor data;

extracting one or more navigational insights based on processing one or more natural language commands obtained from one or more user;

obtaining cost value data from at least one of: the one or more convex hulls, the one or more high-cost zones, the one or more corridor-cost maps, the one or more waypoints, and the one or more navigational insights;

analyzing the virtual cost map layer with one or more path-planning models for real-time local path-planning; and adaptively selecting the one or more navigation paths based on at least one of: the sensor data, the object tracking data, the probabilistic position data, the one or more waypoints, the one or more navigational insights, and the virtual cost map layer for deployment to the one or more robotic devices, enabling autonomous navigation in the dynamic human-centric environments.

* * * * *